(12) United States Patent
Saito

(10) Patent No.: US 7,904,811 B2
(45) Date of Patent: Mar. 8, 2011

(54) TEXT/IMAGE STORAGE DEVICE, IMAGE READING DEVICE, AND IMAGE FORMING APPARATUS

(75) Inventor: Hirohisa Saito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1236 days.

(21) Appl. No.: 11/220,851

(22) Filed: Sep. 8, 2005

(65) Prior Publication Data

US 2006/0055962 A1  Mar. 16, 2006

(30) Foreign Application Priority Data

Sep. 13, 2004 (JP) ................................. 2004-265391

(51) Int. Cl.
*G06N 3/00* (2006.01)
(52) U.S. Cl. ......................................... 715/273; 715/239
(58) Field of Classification Search ................. 358/1.15; 715/273, 234, 239, 243, 254
See application file for complete search history.

(56) References Cited

U.S. PATENT DOCUMENTS

| | | | |
|---|---|---|---|
| 6,094,684 A * | 7/2000 | Pallmann | 709/227 |
| 6,204,934 B1 * | 3/2001 | Minamino | 358/1.9 |
| 6,629,130 B2 * | 9/2003 | Mertama et al. | 709/206 |
| 6,666,594 B2 * | 12/2003 | Parry | 400/74 |
| 6,782,402 B1 | 8/2004 | Hidaka et al. | |
| 6,894,807 B1 * | 5/2005 | Ishitoya et al. | 358/1.9 |
| 7,423,776 B2 * | 9/2008 | Murata | 358/1.16 |
| 2002/0071041 A1 * | 6/2002 | Pine | 348/222 |
| 2002/0080415 A1 * | 6/2002 | Akimoto et al. | 358/402 |
| 2003/0002060 A1 * | 1/2003 | Yokoyama et al. | 358/1.9 |
| 2004/0024743 A1 * | 2/2004 | Kato | 707/1 |
| 2004/0085584 A1 * | 5/2004 | Sasano | 358/2.1 |
| 2004/0190045 A1 * | 9/2004 | Matsuhara et al. | 358/1.15 |

(Continued)

FOREIGN PATENT DOCUMENTS

JP 08-202607 8/1996

(Continued)

OTHER PUBLICATIONS

Smith, J. R., Mohan, R., and Li, C. 1999. Scalable multimedia delivery for pervasive computing. In Proceedings of the Seventh ACM international Conference on Multimedia (Part 1) (Orlando, Florida, United States, Oct. 30-Nov. 5, 1999). Multimedia '99. ACM, New York, NY, 131-140. DOI= http://doi.acm.org/10.1145/319463.319480.*

(Continued)

*Primary Examiner* — Kyle R Stork
(74) *Attorney, Agent, or Firm* — Oblon, Spivak, McClelland, Maier & Neustadt, L.L.P.

(57) ABSTRACT

A storage device is disclosed. The storage device includes a text/image information memory unit, a unit that converts the data format of text/image information, a unit that communicates with a user terminal having a display, and a delivery unit configured to, in response to a request for the property of a file stored in the memory unit from the user terminal through the communication unit, show the property of the corresponding file stored in the memory unit on the display of the user terminal. When the user terminal requests a download of the file by selecting a file format applicable to binary image data, the conversion unit converts text/image information contained in the file into binary image data if the data format of the text/image information is not binary image data but is multilevel image data (color image). Then, the delivery unit sends the binary image data in the selected file format to the user terminal.

19 Claims, 28 Drawing Sheets

U.S. PATENT DOCUMENTS

2004/0243648 A1 12/2004 Hidaka et al.
2005/0046881 A1* 3/2005 Tone et al. ..................... 358/1.9

FOREIGN PATENT DOCUMENTS

| JP | 2000-89997 | 3/2000 |
| JP | 2000-322339 | 11/2000 |
| JP | 3346336 | 9/2002 |
| JP | 2004-194278 | 7/2004 |

OTHER PUBLICATIONS http://www.techsmith.com/download/snagit_getstarted.pdf (Date: Apr. 7, 2004).* http://fay.iniminimo.com/paint.html (Date: Dec. 17, 2003).*

* cited by examiner

FIG.15

| Document Box File List | | | | | | |
|---|---|---|---|---|---|---|
| 🖨 Print  ❌ Delete | | | | | | ⟳ Update |
| Show: printable file ▶ | Search for: (All) ▶ | | | | | |
| ⇩ ⇦ 1/1 ⇨ ⇧ Page: | | GO | Results: 12 ▶ | | Display format: detail ▶ | Start Search |
| Total files:4 | Files Selected:0 | Clear Selection | | | | |
| file name ▲▼ | function | 🔒 | user name ▲▼ | created on ▲▼ | Expires on ▲▼ | total pages | password |
| ☐ COPY0020 | COPY ✿ | | | 2004/3/1 23:19 | | 1 | none |
| ☐ COPY0019 | COPY ✿ | 🔒 | | 2004/3/1 14:20 | 2004/3/4 | 1 | none |
| ☐ COPY0018 | COPY ✿ | 🔒 | | 2004/3/1 14:20 | 2004/3/4 | 1 | none |
| ☐ COPY0017 | COPY ✿ | 🔒 | | 2004/3/1 14:20 | 2004/3/4 | 1 | none |

72

⇧ LOGIN

☐ Top Page
☐ Status
☐ Document Box
☐ Job
☐ Contact
☐ Configuration

TEXT/IMAGE STORAGE DEVICE, IMAGE READING DEVICE, AND IMAGE FORMING APPARATUS

BACKGROUND OF THE INVENTION

1. Field of the Invention

The preset invention relates to a text/image storage device that stores text/image information and transfers a text/image information file to a user terminal in response to a transfer request for the text/image information from the user terminal, an image reading device, and an image forming apparatus using the same. The text/image storage device of the present invention can be employed in document servers, printers, fax machines, document scanners, copy machines, and multifunction devices including such devices that store and use computerized text/document information such as image information taken by digital cameras, document image information from document scanners, text created with word processors, computer graphics and CAD drawings.

2. Description of the Related Art

[Patent document 1] Japanese Patent Laid-Open Publication No. 2000-89997

[Patent document 1] Japanese Patent Laid-Open Publication No. 2000-322338

[Patent document 3] Japanese Patent Laid-Open Publication No. 2002-213148

[Patent document 4] Japanese Patent Laid-Open Publication No. 2004-194278

Network systems that store image information from document scanners and documents created or edited by personal computers into document servers and use text/image information stored in the servers by downloading through networks are well known. These systems can be also used to store text/image information from document scanners and personal computers in document servers directly or through networks. Patent Document 1 discloses a network system of this type. In the meantime, network scanners that deliver images read by a document scanner to networks are widely used. Such a network scanner can store read images in a hard disk and can download them to terminals on a network. Patent Document 2 discloses a system using a scanner of this type.

In these years, it is becoming common to connect various types of image processing devices to a network such as a local area network (LAN). Users can store a large volume of image information in the image processing devices, send the stored image information to an information processing device on the network, and download information from the information processing device. In a network environment as described above, file formats commonly used for image information to be downloaded are multipage TIFF (Tagged Image File Format) and PDF (Portable Document Format). Files in these file formats can be read by an information processing device, so that users can see images contained in the files.

There are different types of data formats, such as binary data (binary image data) in which one bit is allocated to each pixel of an image, multilevel data (multilevel image data) in which plural bits are allocated to each pixel of an image, and vector data comprised of multilevel data (codes) representing types of shapes and characters, positions, and areas. Binary image data represent one-color binary images, which are generally called black-and-white images although they can also represent binary images in any one of, for example, yellow (Y), magenta (M), and cyan (C). The binary image data can be encoded in MH, MR, MMR, and JBIG formats. Among them, the MH format is commonly used because of its high compression rate. Multilevel image data, including gray scale images (monochrome halftone images such as black-and-white pictures) and color images (multicolor halftone images such as color pictures), are usually encoded in a JPEG format.

If text/image data are not compressed, binary data (binary image data) and multilevel data (multilevel image data and vector data) can be transferred as a TIFF file or a PDF file. For increasing transfer rate or lowering the amount of memory required, text/image information is converted in a file after being compressed and encoded. However, in many cases, if multilevel image data are compressed and transferred as a multipage TIFF file, personal computers (user terminals) cannot use the file.

According to Patent Document 3, if a file format is multipage TIFF, compressed binary image data are transferred as a file in TIFF-S (Tagged Image File Format Profile S), and compressed multilevel image data are transferred as a file in TIFF-C (Tagged Image File Format Profile C). However, TIFF-supporting software (e.g. Internet Explorer) installed as a standard application in Microsoft Windows™, which is the most widely used operating system for personal computers, supports compressed binary image data but not compressed multilevel image data. Because of this, the data format of text/image information in TIFF is usually binary image data (e.g. black-and-white image) compressed and encoded in an MH format. If compressed multilevel image data (e.g. color image) in TIFF are downloaded to a personal computer, the data cannot be read by the personal computer. That is, multilevel image data need to be converted into binary image data at the time of download so as to be used in TIFF.

Patent Document 4 discloses a multifunction copy machine having a color and monochrome copier function, a fax function, and an image file storing function. A HDD of the copy machine holds image data in various compression formats with various resolutions (dpi). When a transfer of the image data in a specified data format is ordered from a personal computer, by which image data are to be used, or from an operations panel of the multifunction copy machine, the multifunction copy machine converts the image data into the specified data format and transfers the data to the personal computer.

SUMMARY OF THE INVENTION

A general object of the present invention is to provide a text/image storage device, an image reading device, and an image forming apparatus to solve at least one problem described above. A specific object of the present invention is to provide a text/image storage device, an image reading device, and an image forming apparatus that facilitate exchanging text/image information files which can be used by a user terminal.

According to exemplary embodiments of the present invention, the following effects and advantages can be obtained.

According to an aspect of the present invention, there is provided a text/image storage device comprising a memory unit to store a text/image information file; a data format conversion unit to convert a data format of text/image information contained in the text/information file into binary image data; a communication unit including a display and configured to communicate with a user terminal; and a delivery unit configured to, in response to a request for the property of the text/image information file stored in the memory unit sent from the user terminal through the communication unit, show the property of the corresponding text/image information file on the display of the user terminal; wherein in a case where the user terminal requests a download of the text/image information file the property of which is requested by selecting a file format applicable to binary image data, if the text/image information file is in a data format different from binary image data, the delivery unit sends the text/image information file in the selected file format to the user terminal after the data format conversion unit converts the data format of the text/image information to the binary image data.

With this text/image storage device, the text/image information (color image) in a data format different from binary image data can be sent to the user terminal in the file format (TIFF) applicable to the binary image data, and a user can use an image file in TIFF even if the text/image information is a color image.

According to another aspect of the present invention, there is provided a text/image storage device comprising a memory unit to store a text/image information file; a data format conversion unit to convert a data format of text/image information contained in the text/information file into binary image data; a communication unit including a display and configured to communicate with a user terminal; and a delivery unit configured to, in response to a request for a property of the text/image information file stored in the memory unit sent from the user terminal through the communication unit, show the property of the corresponding text/image information file on the display of the user terminal; wherein in a case where the user terminal requests a download of the text/image information file the property of which is requested by selecting a file format applicable to the binary image data and disabling an option of performing a conversion to binary image data, if the text/image information file is in a data format different from the binary image data, the delivery unit shows a selection error on the display.

As the selection error is displayed on the user terminal display, the user can know that a combination of the file format (TIFF) and the data format selected by the user is not available.

According to still another aspect of the present invention, there is provided a text/image storage device comprising a memory unit to store a text/image information file; a data format conversion unit to convert a data format of text/image information contained in the text/information file into binary image data; a communication unit including a display and configured to communicate with a user terminal; and a delivery unit configured to, in response to a request for the property of the text/image information file stored in the memory unit sent from the user terminal through the communication unit, show the property of the corresponding text/image information file on the display of the user terminal; wherein in response to the request for the property, the delivery unit also shows whether the text/image information file the property of which is requested contains image information in a data format different from the binary image data.

Other objects, features and advantages of the present invention will be readily apparent to those skilled in the art from a review of the following detailed descriptions of the preferred embodiments in conjunction with the accompanying drawings.

BRIEF DESCRIPTION OF THE DRAWINGS

FIG. 15 is a plan view of a "document box list" screen displayed by the network controller shown in FIG. 7 on a display of a personal computer provided as a user terminal;

DETAILED DESCRIPTION OF THE PREFERRED EMBODIMENT

First Embodiment

Figure 1:
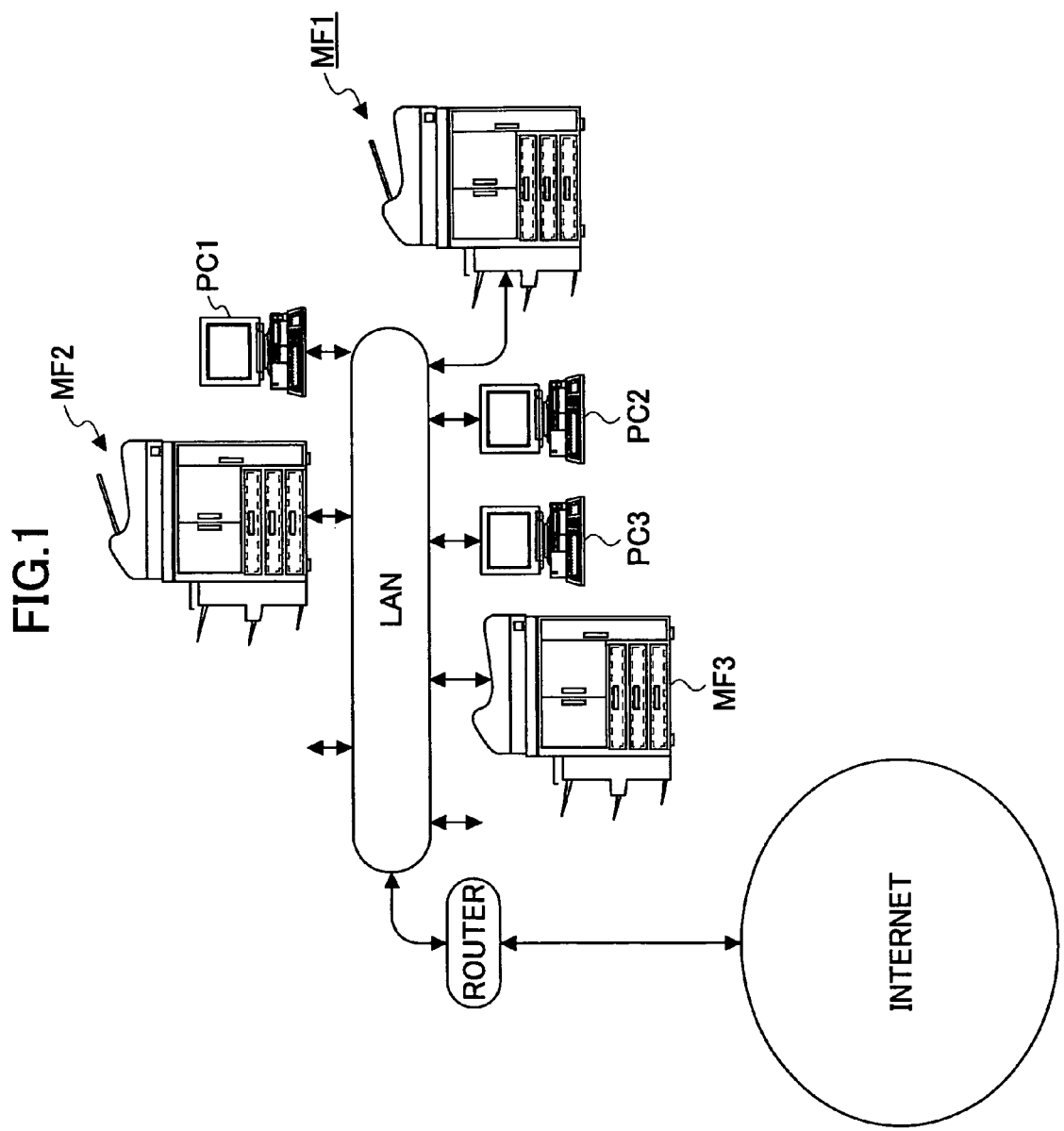
FIG. 1 is a block diagram illustrating a network to which is connected a multifunction copy machine equipped with an image data processing device as a text/image storage device according to a first embodiment of the present invention.

FIG. 1 illustrates a network to which is connected a multifunction copy machine MF1 equipped with a text/image storage device ACP according to a first embodiment of the present invention. The multifunction copy machine MF1 is connected to a LAN (Local Area Network). Personal computers PC1-PC3 as user terminals and other multifunction copy machines MF2 and MF3 are also connected to the LAN. The devices PC1-PC3 and MF1-MF3 connected to the LAN, which is connected to the Internet via a router, can send and receive control information and image/text information to/from each other, and to/from other devices or servers through the Internet. Each of the devices PC1-PC3 and MF1-MF3 has an IP address. When the multifunction copy machines MF1-MF3, which also serve as sites (servers) with URLs, are accessed through the network (LAN or Internet), they return top pages (home pages) serving as menu screens for allowing remote control of the multifunction copy machines MF1-MF3. For example, when the PC1 accesses the MF1, the MF1 sends a top page to the PC1. The PC1 displays the top page on a display (user display) connected to the PC1. The top page shows a block for entering a user (user of the PC1) ID and a password as well as menu items. When the user enters an ID and a password registered in the MF1 and presses an enter key on the keyboard or clicks on a login button on the top page, the PC1 sends the entered information to the MF1. In response, the MF1 sends display control information for activating the menu items on the top page to the PC1, so the menu items on the top page are activated (or ready to accept input).

In this embodiment, as described above, the MF1 provides (sends) the display information to the PC1, and the PC1 displays the display information on the user display. Then, the PC1 sends user's input on a displayed screen to the MF1, and the MF1 determines the next task in response to the user's input. For instance, the MF1 sends information for changing the display screen to the PC1. That is, the MF1 changes contents displayed on the user display and determines the task according to user's input on the displayed screen. In the following explanation, operations by the MF1 for sending information and for responding to received information are simply described with the phrases "displaying on the user display", "switching the displayed contents" and "performing . . . in response to user inputs".

Figure 2:
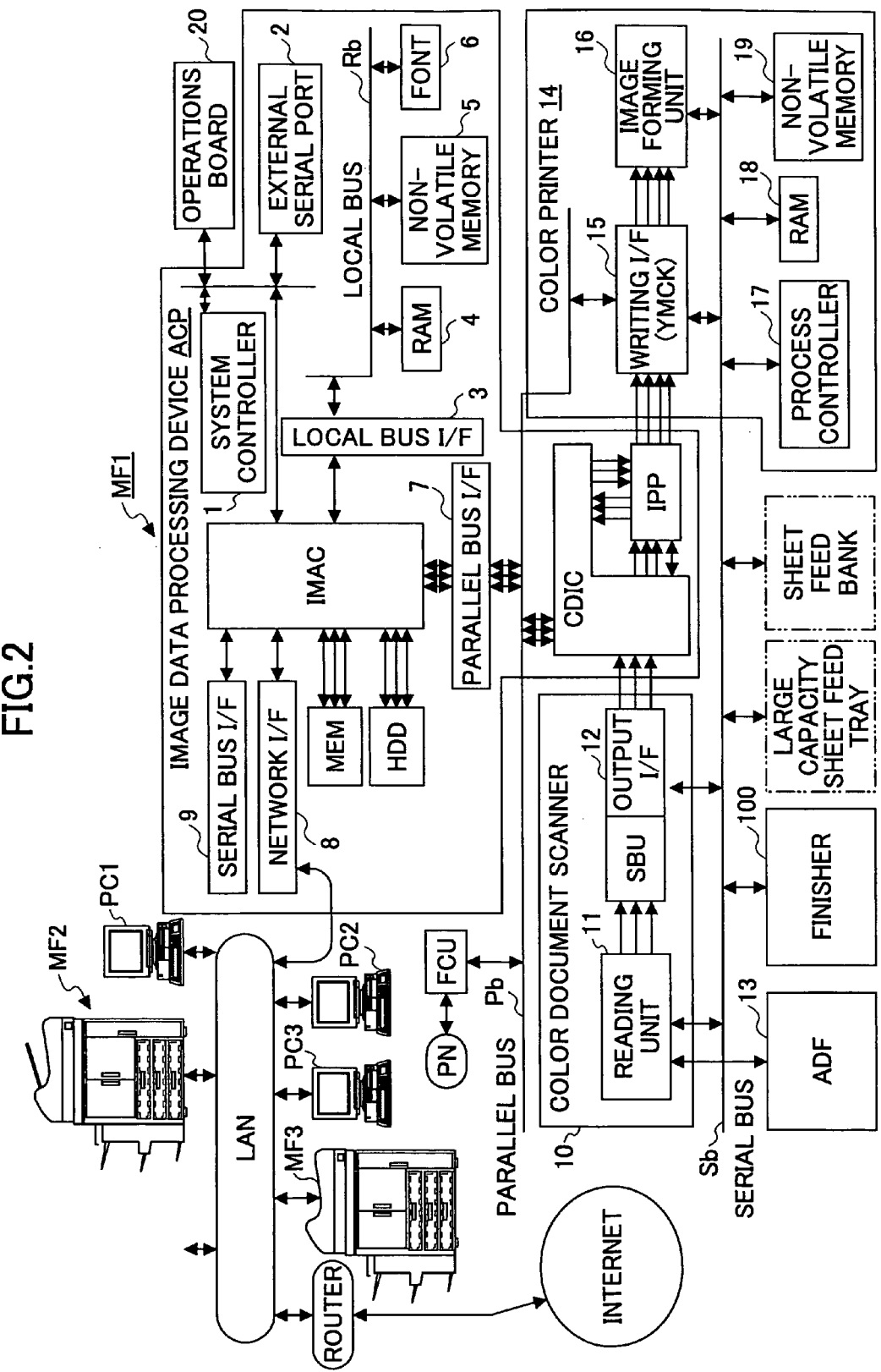
FIG. 2 is a block diagram illustrating an image processing system of the multifunction copy machine of FIG. 1.
Figure 3:
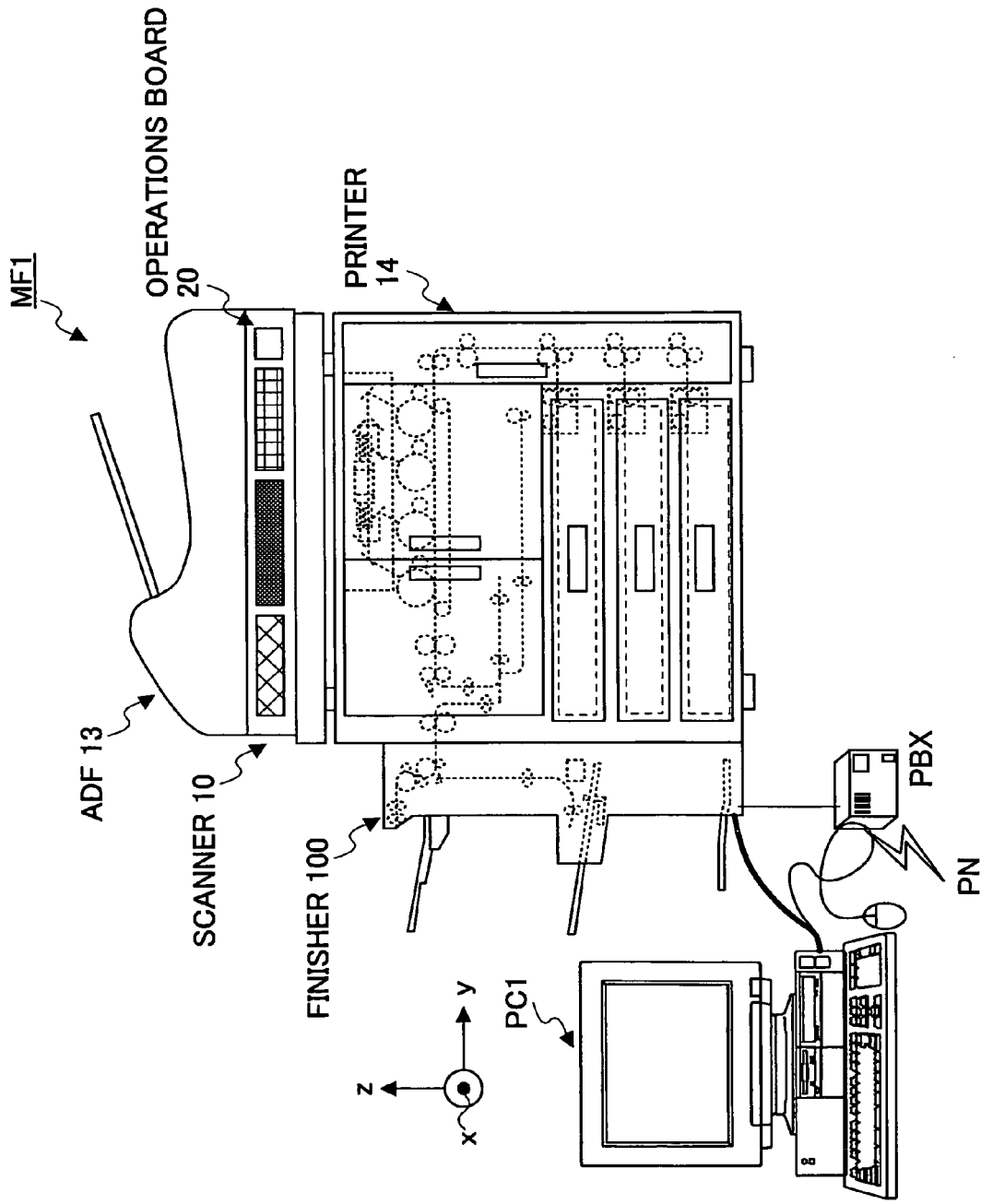
FIG. 3 is a front view illustrating the multifunction copy machine of FIG. 1.
Figure 4:
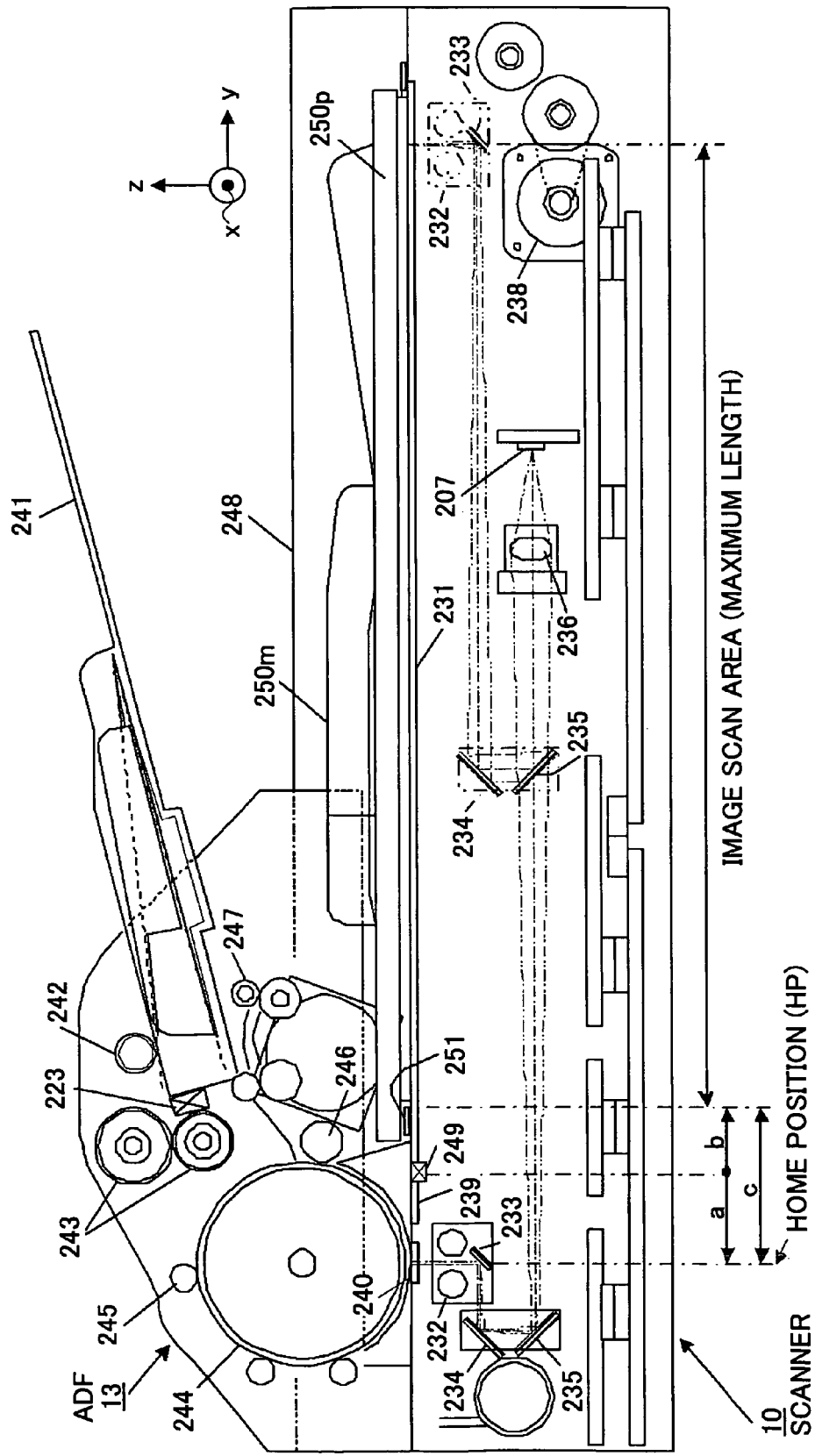
FIG. 4 is an enlarged vertical cross-sectional view of a color document scanner shown in FIGS. 2 and 3 equipped with an ADF.
Figure 5:
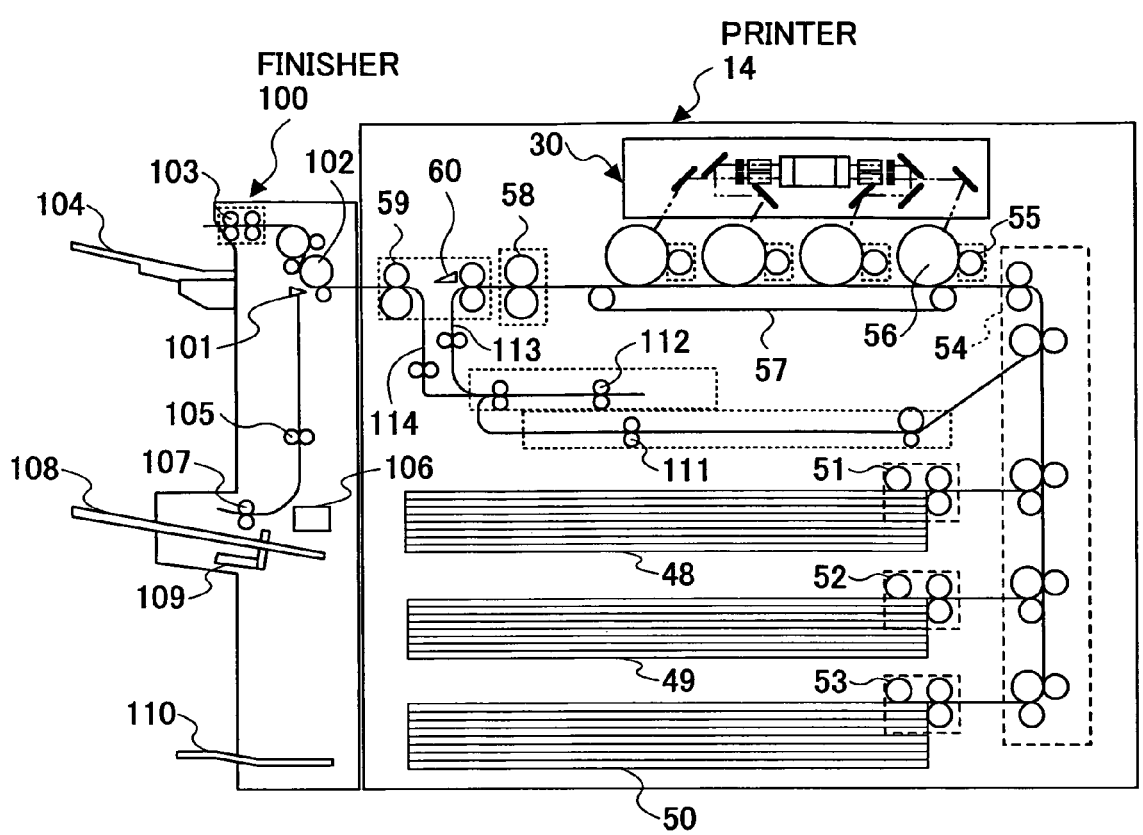
FIG. 5 is an enlarged vertical cross-sectional view of an image forming mechanism of a color printer shown in FIGS. 2 and 3.

FIG. 2 illustrates the system configuration of a text/image information processing system of the MF1. In this system, a color document scanner 10 comprising a reading unit 11 and an image data output I/F (Interface) 12 is connected to an image data interface controller CDIC (herein after referred to simply as "CDIC") of the image data processing device ACP serving as a text/image storage device. A color printer 14 is connected to the image data processing device ACP. The color printer 14 is configured to receive recorded image data from an image data processor IPP (hereinafter referred to simply as "IPP") of the image data processing device ACP into a writing I/F 15, and print it out with an image forming unit 16. The color document scanner 10 is shown in FIG. 4. and the image forming unit 16 is shown in FIG. 5. The appearance of the multifunction copy machine MF1 is illustrated in FIG. 3.

The image data processing device ACP (hereinafter referred to simply as "ACP") shown in FIG. 2 comprises a parallel bus Pb, an image memory access controller IMAC (hereinafter referred to simply as "IMAC"), memory module MEM (hereinafter referred to simply as "MEM") serving as an image memory, a hard disk device HDD (hereinafter referred to simply as "HDD") storing programs and text/image information, a system controller 1, a RAM 4, a nonvolatile memory 5, a font ROM 6, the CDIC, and the IPP. A facsimile control unit (hereinafter referred to simply as "FCU") is connected to the parallel bus Pb. The operations board 20 is connected to the system controller 1.

The reading unit 11 of the color document scanner 10 for optically reading a document is configured to photoelectrically convert light reflected from a document illuminated by a lamp into R, G, B image signals using a CCD of a sensor board unit (hereinafter referred to simply as "SBU"). An A/D converter converts the signals into RGB image data. A shading correction is performed on the image data, and the image data are sent to the CDIC through the output I/F 12.

The CDIC performs image data related operations, more specifically, performs data transfer with the color document scanner 10 (output I/F 12), the parallel bus Pb, and the IPP, and communicates with a process controller 17 and the system controller 1 that controls the ACP. A RAM 18 is provided as a work area for the process controller 17. A nonvolatile memory 19 holds operation programs of the process controller 17.

The image access controller IMAC (hereinafter referred to simply as "IMAC") controls operations for writing/reading image data to/from the MEM and the HDD serving as memory units for holding text/image information. The system controller 1 controls operations for writing/reading data such as control data, excluding image data, to/from the HDD, and controls operations of components connected to the parallel bus Pb. The RAM 4 is provided as a work area for the system controller 1. The nonvolatile memory 5 holds operation programs of the system controller 1.

The operations board 20 is used for specifying a function to be preformed by the ACP. For example, the type of function (copier, facsimile transmission, print) and the number of pages are specified with use of the operations board 20. That is, image data control information can be input.

The SBU of the scanner 10 performs a shading correction of the image data read by the reading unit 11 of the scanner 10. Then, the IPP performs image processing for correcting distortion due to reading operations, such as a scanner gamma correction and filtering. After that, the image data are stored in the MEM or the HDD. For printing out the image data held in the MEM or the HDD, the IPP performs image quality control operations including a color conversion from RGB signals to YMCK signals, a printer gamma conversion, and tone control such as a tone conversion, dithering and error diffusion. After the image quality control operations, image data are transferred from the IPP to the writing I/F 15. The writing I/F 15 performs laser control of the tone controlled signals by modulating pulse width and power. Then, the image data are sent to the image forming unit 16, and the image forming unit 16 forms a reproduced image on a transfer sheet.

The IMAC is configured to perform, under the control of the system controller 1, access control of image data in the MEM and the HDD, an expansion of print data of the personal computer PC1, etc., connected to the LAN, compressions and expansions of image data for effective use of the MEM and HDD, and image data transfer to the personal computer PC1, etc.

The image data sent to the IMAC are compressed and stored in the MEM or HDD. The stored image data are read out when needed. The read out image data are expanded back to their original state, and returned to the CDIC via the parallel bus Pb. After being transferred from the CDIC to the IPP, the image data go through image quality control and are output to the writing I/F 15. Then, the image forming unit 16 forms a reproduced image on a transfer sheet.

In the flow of image data, bus control in the parallel bus Pb and the CDIC realizes functions of a digital multifunction machine. In a facsimile transmission operation, the read image data are processed by the IPP, and transferred to the FCU (facsimile control unit) via the CDIC and the parallel bus Pb. The FCU converts the image data into data for a communication network, and sends the converted data as facsimile data to a public line PN. On the other hand, in a facsimile reception operation, the FCU converts line data from the public line PN into image data, and the image data are transferred to the IPP via the parallel bus Pb and the CDIC. The image data are output from the writing I/F 15 without any image quality control, and the image forming unit 16 forms a reproduced image on a transfer sheet.

When plural jobs, e.g., a copier function, facsimile transmission/reception functions, a printer output function, are executed in parallel, the system controller 1 and the process controller 17 assign rights to use the reading unit 11, the image forming unit 16, and the parallel bus Pb to the jobs. The process controller 17 controls the flow of image data, while the system controller 1 controls the whole system and manages activation of resources. Functions of the digital multifunction machine to be used are selected on the operations board 20, and functions to be executed such as a copier function and a facsimile function are set according to the selection and inputs on the operations board 20.

The system controller 1 and the process controller 17 communicate with each other through the parallel bus Pb, the CDIC, and a serial bus Sb. More specifically, by performing data format conversions of data for the parallel bus Pb and the serial bus Sb and for interfaces within the CDIC, the system controller 1 and the process controller 17 communicate with each other.

Bus interfaces such as a parallel bus I/F 7, a serial bus I/F 9, a local bus I/F 3 and the network I/F 8 are connected to the IMAC. The system controller 1 is connected to related units via plural buses in order to maintain independence within the ACP.

The system controller 1 is configured to control other function units via the parallel bus Pb. The parallel bus Pb serves to transfer image data. The system controller issues to the IMAC an operation control instruction for storing image data in the MEM. The operation control instruction is sent via the IMAC, the parallel bus I/F 7, and the parallel bus Pb. In response to the operation control instruction, the image data are sent from the CDIC to the IMAC through the parallel bus Pb and the parallel bus I/F 7. The image data are then stored in the MEM under the control of the IMAC.

On the other hand, the system controller 1 of the ACP, when called as a printer function by a personal computer, serves as a printer controller, a network controller, and a serial bus controller. The IMAC receives print output request data through the network I/F 8, if the data are sent via a network.

The system controller 1 expands print output request data sent from the personal computer into image data. The expanded data are stored in an area within the MEM. Font data required for the expansion are acquired by referring to the font ROM 6 through the local bus I/F 3 and a local bus Rb. The local bus Rb connects the controller 1 to the nonvolatile memory 5 and the RAM 4. The serial bus Sb includes an external serial port 2 for connection with the personal computers and an interface for transfer between the operations board 20 provided as an operations section of the ACP. This communicates with the system controller 1 through the IMAC and accepts procedures and displays the system state in place of the print expanded data. Data transmission/reception between the system controller 1 and the MEM, the HDD, and other buses is performed via the IMAC. Jobs that use the MEM or the HDD are controlled centrally by the ACP.

FIG. 3 illustrates the appearance of the multifunction copy machine MF1. This full-color multifunction copy machine comprises an automatic document feeder (ADF) 13, the operations board 20, the color document scanner 10, the color printer 14, and a finisher 100. The operations board 20 and the color document scanner 10 equipped with the ADF 13, and the finisher 100 are detachable from the printer 14. The color document scanner 10 comprises a control board including a power device driver, sensor inputs, and a controller. The color document scanner 10 is configured to communicate directly or indirectly with the image data processing device ACP (FIG. 2) of the control board in the printer 14 and read document images at a controlled timing.

The LAN connected to the personal computers PCs is connected to the image data processing device ACP (FIG. 2). An exchanger PBX connected to the public line PN (facsimile transmission line) is connected to the facsimile control unit FCU (FIG. 2). A sheet printed by the color printer 14 is ejected onto the finisher 100.

FIG. 4 illustrates a document image reading mechanism of the scanner 10 and the ADF 13 attached thereto. A document placed on a contact glass 231 of the scanner 10 is illuminated by illumination lamps 232. Reflected light (image light) of the document is reflected parallel to a sub scanning direction y by a first mirror 233. The illumination lamps 232 and the first mirror 233 are mounted on a first carriage (not shown), which is driven in the sub scanning direction y at a constant speed. Second and third mirrors 234 and 235 are mounted on a second carriage (not shown), which is driven in the same direction as the first carriage at half the speed of the first carriage. The image light reflected by the first mirror 233 is reflected downward (in a direction z) by the second mirror 234, and then reflected in the sub scanning direction y by the third mirror 235. The light is focused by a lens 236 to be incident on a CCD 207, and converted into electric signals. A carriage motor 238 provided as a drive source reciprocates the first and second carriages in the y direction, causing the carriages to scan the document and to return to the original position. Although the scanner 10 is a flatbed document scanner that scans the document on the contact glass 231 with the lamps 232 and the mirror 233, and projects the document images onto the CCD 207, the scanner 10 can perform sheet-feed reading. For sheet-feed reading operations, a glass 240 serving as a sheet-feed reading window is provided in a read field of the first mirror 233 on the first carriage located at a home position (standby position) HP. The automatic document feeder (ADF) 13 is arranged at the upper side of the glass 240. Also, the glass 240 is opposed by a transport drum (platen) 244 of the ADF 13.

A document placed on a document tray 241 of the ADF 13 is inserted between the transport drum 244 and a pressure roller 245 by a pickup roller 242 and a pair of resist rollers 243. The document adhered on the transport drum 244 is fed past on the reading glass 240. Then, the document is ejected by eject rollers 246 and 247 to a catch tray, also serving as a pressure plate, under the document tray 241.

When the document passes over the reading glass 240 serving as a document reading window, the images on the surface of the document are illuminated by the illumination lamps 232 held stationary under the reading glass 240. The reflected light of the surface of the document passes through the first mirror 233 and its downstream optical systems to be incident on the CCD 207, where the light is photoelectrically converted. In other words, the light is converted into RGB color image signals. The surface of the transport drum 244 is white, which is a white backboard opposing the reading glass 240 and serves as a white reference face.

A white reference plate 239 and a base point sensor 249 for detecting the first carriage are provided between the reading glass 240 and a scale 251 that serves to determine the position of a document edge. The white reference plate 239 serves to enable shading correction for correcting variation of intensity of the read data. A variation of intensity occurs due to a variation of luminescent intensity between the illumination lamps 232, a variation of a main scanning direction, a variation of sensitivity among pixels of the CCD 207, even when a document with a uniform density is read.

A substrate 248 of the ADF 13 is hinged at a back side (back side of the paper showing in FIG. 4) to a substrate of the scanner 10. The ADF 13 is opened by pulling a handle 250*m* at the front side of the substrate (front side of the paper showing in FIG. 4). A switch for detecting the ADF 13 being opened/closed is provided at the back side of the substrate 248 of the ADF 13. A pressure plate 250*p* of the ADF 13 opposing the contact glass 231 is attached to a bottom face of the ADF 13. When the ADF 13 is closed, the pressure plate 250*p* is brought into tight contact with an upper face of the contact glass 231 as shown in FIG. 4.

FIG. 5 illustrates a mechanism of the color printer 14. The color printer 14 of this embodiment is a laser printer. Four sets of assemblies (image forming units), each including a photoreceptor 56, a development unit 55, a charger (not shown), a cleaning unit, and a transcriber, are provided for forming images of M (magenta), C (cyan), Y (yellow), and Bk (black), respectively. The assemblies are arranged in tandem in this order along a transport belt 57 so as to sequentially transfer toner images of corresponding colors to a transfer sheet.

A first sheet feeder 51, a second sheet feeder 52, and a third sheet feeder 53 feed transfer sheets stored in a first tray 48, a second tray 49, and a third tray 50, respectively. A vertical transport unit 54 transports the sheets until the sheets abut the photoreceptor 56.

Image data read by the scanner 10 are corrected by the image data processor IPP (FIG. 2) and written into the memory MEM (FIG. 2). Then, the image data are read out, exposed to a laser from a writing unit 30, and written onto the photoreceptor 56 uniformly charged by the charger (not show). Thus, an electrostatic image is formed. When the electrostatic latent image passes through the development unit 55, a toner image appears on the photoreceptor 56. The transfer sheet is transported by the transport belt 57 at the same speed as the rotation speed of the photoreceptor 56, so that the toner image on the photoreceptor 56 is transferred. After that, the image is fixed by a fixer unit 58, and the sheet is ejected by a sheet eject unit 59 to the finisher 100 serving as a post-processing device.

The finisher 100 of FIG. 5 serving as a post-processing device guides the transfer sheet transported by the sheet eject unit 59 to a sheet eject roller 103 or to a stapling section. When a switching plate 101 is oriented upward, the sheet is ejected to a catch tray 104 by the sheet eject roller 103. On the other hand, when the switching plate 101 is oriented downward, the sheet is ejected to a staple table 108 by transport rollers 105 and 107. On the staple table 108, a jogger 109 aligns the edge of transfer sheets each time a transfer sheet is ejected, and a stapler 106 staples the sheets when a set of sheets of a copy is completed. A set of transfer sheets stapled by the stapler 106 is, by its own weight, stored on a staple finished catch tray 110.

The catch tray 104 is movable back and forth (in a direction vertical to the paper showing FIG. 5). The catch tray 104 moves back and forth so as to sort ejected sheets based on original documents or based on a set of sheets sorted by an image memory. In the case of forming images on both sides of a transfer sheet, when images are printed on the transfer sheet from the trays 48-50, the sheet is guided to a reversing unit 112 by turning a branching claw 60 provided for path switching so as to be reserved and stacked in a duplex sheet feed unit 111 instead of being guided to the catch tray 104.

The duplex sheet feed unit 111 feeds the transfer sheet stacked therein such that a toner image formed on the photoreceptor 56 is transferred to the reverse side of the sheet. Then, the branching claw 60 provided for path switching is turned to be horizontal so as to guide the sheet to the catch tray 104. The reverse unit 112 and the duplex sheet feed unit 111 are used in this manner for forming images on both sides of a transfer sheet.

The photoreceptor 56, the transport belt 57, the fixer unit 58, the sheet eject unit 59, and the development unit 55 are driven by a main motor (not shown). The sheet feeders 51-53 are driven with the driving force of the main motor transferred through a sheet feed clutch (not shown). The vertical transport unit 54 is driven with the driving force of the main motor transferred through a middle clutch (not shown).

Figure 6:
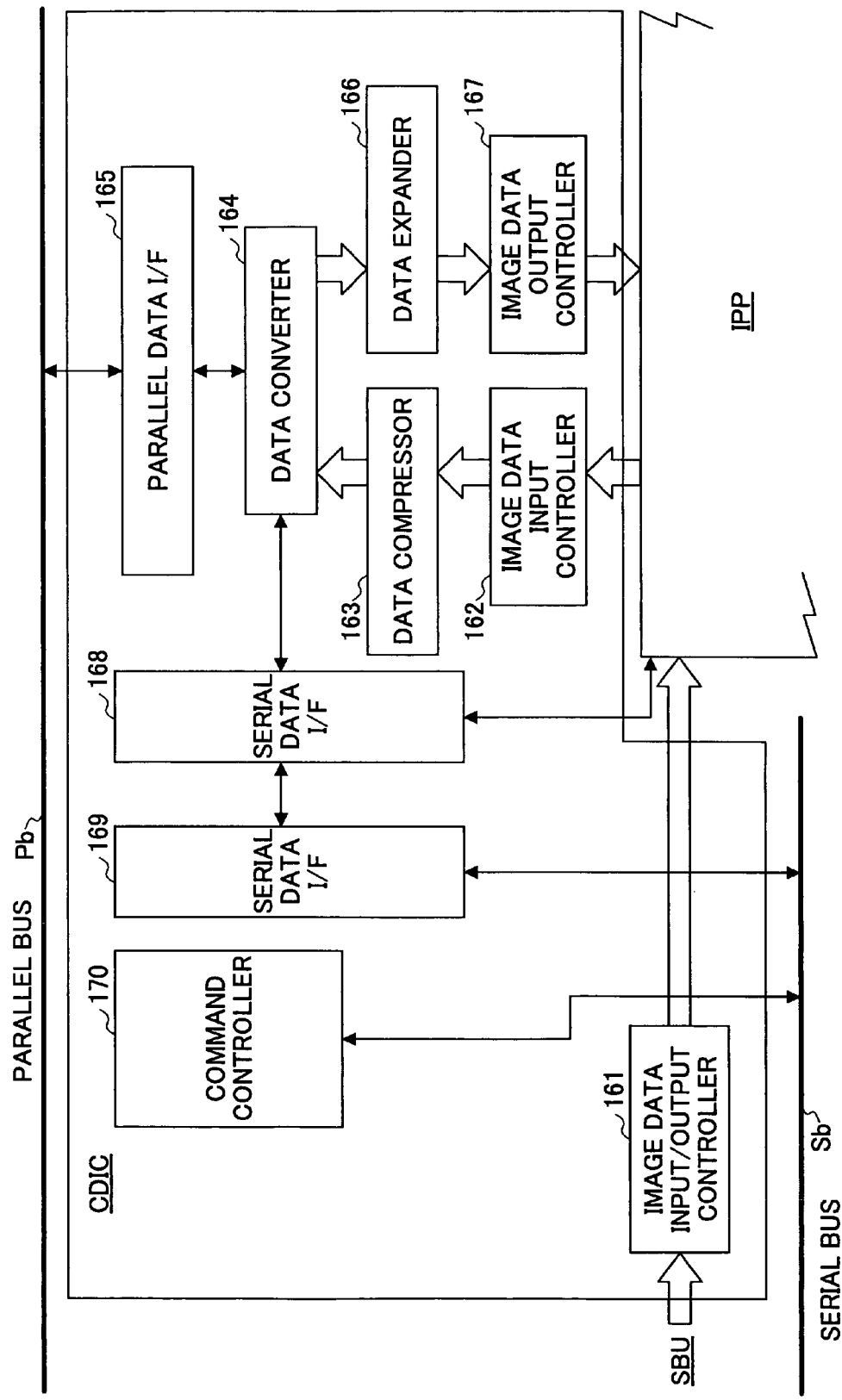
FIG. 6 is a functional block diagram of an image data interface controller shown in FIG. 2.

FIG. 6 illustrates a functional block diagram of the CDIC. The image data input/output controller 161 receives image data output from the color document scanner 10 (SBU) and outputs the image data to the IPP. The IPP performs "scanner image processing" 190 (FIGS. 8 and 9) of the image data and outputs the data to an image data input controller 162 of the CDIC. The data received by the image data input controller 162 are sent to a data compressor 163, where primary image data compression is performed for improving transfer efficiency in the parallel bus Pb. The compressed image data are converted into parallel data by a data converter 164 and sent to the parallel bus Pb through a parallel data I/F 165. Image data input from the parallel data bus Pb through the parallel data I/F 165 are serial converted by the data converter 164. The data, which are in a primary compressed state for bus transfer, are expanded by a data expander 166. The expanded image data are transferred to the IPP by an image data output controller 167. In the IPP, RGB image data are converted into YMCK image data by "printer image quality control" 300 (FIGS. 8 and 9), and output to the color printer 14 as image data Yp, Mp. Cp, and Kp such that the printer 14 can output the image.

The CDIC has both functions for conversion to parallel data to be transferred through the parallel bus Pb and for conversion to serial data to be transferred through the serial bus Sb. The system controller 1 transfers data to the parallel bus Pb, while the process controller 17 transfers data to the serial bus Sb (FIG. 2). For enabling communications between the two controllers 1 and 17, the data converter 164 and a serial data I/F 169 perform parallel/serial data conversion. A serial data I/F 168 is provided for serial data transfer to/from the IPP.

Figure 7:
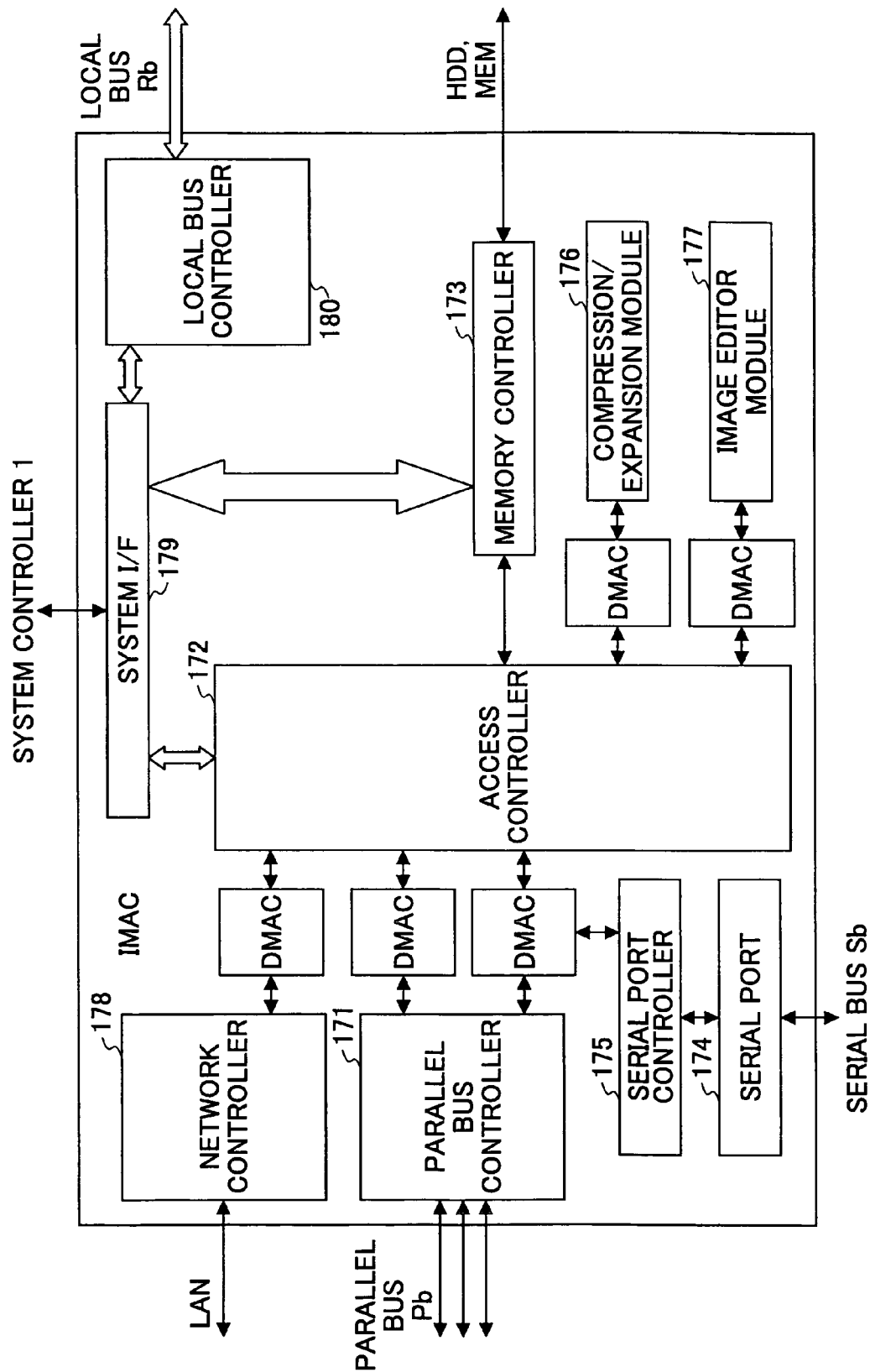
FIG. 7 is a functional block diagram of an image memory access controller shown in FIG. 2.

FIG. 7 illustrates a block diagram of the IMAC. The IMAC comprises an access controller 172, a memory controller 173, a secondary compression/expansion module 176, an image editor module 177, a system I/F 179, a local bus controller 180, a parallel bus controller 171, a serial port controller 175, a serial port 174, and a network controller 178. The secondary compression/expansion module 176, the image editor module 177, the parallel bus controller 171, the serial port controller 175, and the network controller 178 are connected to the access controller 172 through corresponding DMACs (direct memory access controllers).

The system I/F 179 sends/receives instructions and data to/from the system controller 1. Basically, the system controller 1 controls the ACP. The system controller 1 also manages allocation of resources of the MEM and the HDD, and controls other units through the system I/F 179, the parallel bus controller 171, and the parallel bus Pb.

Units included in the ACP are basically connected to the parallel bus Pb. Therefore, the parallel bus controller 171 controls data transmission to and reception from the system controller 1, the MEM, and the HDD by controlling bus operations.

The network controller 178 controls connection with the LAN and the Internet. The network controller 178 controls data transmission to and reception from external expansion units connected to the network. More specifically, the network controller 178 sends and receives files and mail through the LAN and the Internet using a WWW server, an FTP server, an SMTP server, DHCP server registered (set up) in the HDD, and other servers used for sending and receiving file and mail transmission/reception. The network controller 178 also generates files to be sent and adds received files to a directory. The system controller 1 controls a network interface in the IMAC. For example, the system controller 1 orders the IMAC to generate files to be sent, generate a directory in a destination, and perform transmission according to a document read and transmission commands from the operations board 20 or the personal computer.

The serial port 174 connected to the serial bus Sb comprises plural ports. The serial port controller 175 comprises the same number of port control mechanisms as the number of types of the buses. The serial port controller 175 receives commands from an operations part and controls transmission/reception of display data separately from the external serial port.

The local bus controller 180 interfaces with the local bus Rb connected to the RAM 4 required for starting the system controller 1, the nonvolatile memory 5, and the font ROM 6 for expanding printer code data.

The access controller 172 performs command control for the system controller 1 through the system I/F 179. The access controller 172 also controls access to the MEM and the HDD by external units. The image data are transferred to the IMAC from the CDIC through the parallel bus Pb. The image data are loaded into the IMAC through the parallel bus controller 171.

Memory access of the loaded image data is free from direct control by the system controller 1. That is, the memory access is controlled by the memory access controllers (DMACs) independently from the system controller 1. The access controller 172 controls access requests to the MEM and the HDD from plural units. The memory controller 173 controls operations for accessing, reading out data from, and writing data into the MEM and the HDD.

In access operations from the network to the MEM or the HDD, data loaded from the network into the IMAC through the network controller 178 are transferred to the MEM and the HDD by the direct memory access controllers DMACs. The access controller 172 controls accesses from plural jobs to the MEM or the HDD. The memory controller 173 reads out data from, and writes data into the MEM or the HDD. In access operations from the serial bus to the MEM or the HDD, data loaded by the serial port controller 175 into the IMAC through the serial port 174 are transferred to the MEM or the HDD by the direct memory access controllers DMACs.

Print output data from the personal computers connected to the network or the serial bus are expanded by the system controller 1 into a memory area within the MEM or the HDD using font data stored on the local bus Rb.

The system controller 1 controls interfaces with the external units. The DMACs shown in FIG. 7 control memory access of the data loaded in the IMAC. As the DMACs execute data transfer independently from each other, the access controller 172 controls conflict of jobs accessing the MEM and the HDD or sets priorities of access requests.

The MEM and the HDD are accessed not only by the DMACs but also by the system controller 1 through the system I/F 179 for the purpose of bitmap expansion of stored data. In the access controller 172, DMAC data permitted to access the MEM or the HDD, or the data from the system I/F 179 are directly transferred to the MEM or the HDD by the memory controller 173.

The IMAC includes the secondary compression/expansion module 176 and the image editor module 177 for processing the data. The secondary compression/expansion module 176 has an MH encoding/decoding function for compressing and expanding binary image data, a JPEG encoding/decoding function for compressing and expanding multilevel image data, a function for converting a file format into a TIFF file, and a function for converting a file format into a PDF file. The secondary compression/expansion module 176 compresses data and converts the data into a file in order to effectively hold image data and code data in the MEM and the HDD, and expands compressed data. The secondary compression/expansion module 176 controls interfaces with the MEM and the HDD using the DMAC. When text/image information is stored in the HDD or the MEM, the text/image information is converted into a desired data format and a file format by the secondary compression/expansion module 176. When text/image information read from the HDD or the MEM is sent to the network, the text/image information is converted into a desired data format and a file format by the secondary compression/expansion module 176 if necessary.

Image data stored in the MEM or the HDD are called by the direct memory access controller DMAC to the secondary compression/expansion module 176 through the memory controller 173 and the access controller 172. The image data are converted in the secondary compression/expansion module 176, and then returned to the MEM or the HDD or output to an external bus.

The image editor module 177 controls the MEM and the HDD through the DMAC so as to process data in the MEM and the HDD. More specifically, the image editor module 177 is adapted to clear the memory areas and to perform data processing such as an operation for rotating image data and an operation for synthesizing different images. The image editor module 177 reads the secondary compressed data from the MEM or the HDD and causes the secondary compression/expansion module 176 to expand the read data to first compressed data. Then, the image editor module 177 expands the first compressed data to image data in a memory in the module 177 based on the same decoding logic as the data expander 166 of the CDIC, and processes the expanded image data. The processed image data are primary-compressed based on the same encoding logic as the primary compression logic of the CDIC, and secondary-compressed by the secondary compression/expansion module 176 so as to be written in the MEM or the HDD.

Figure 8:
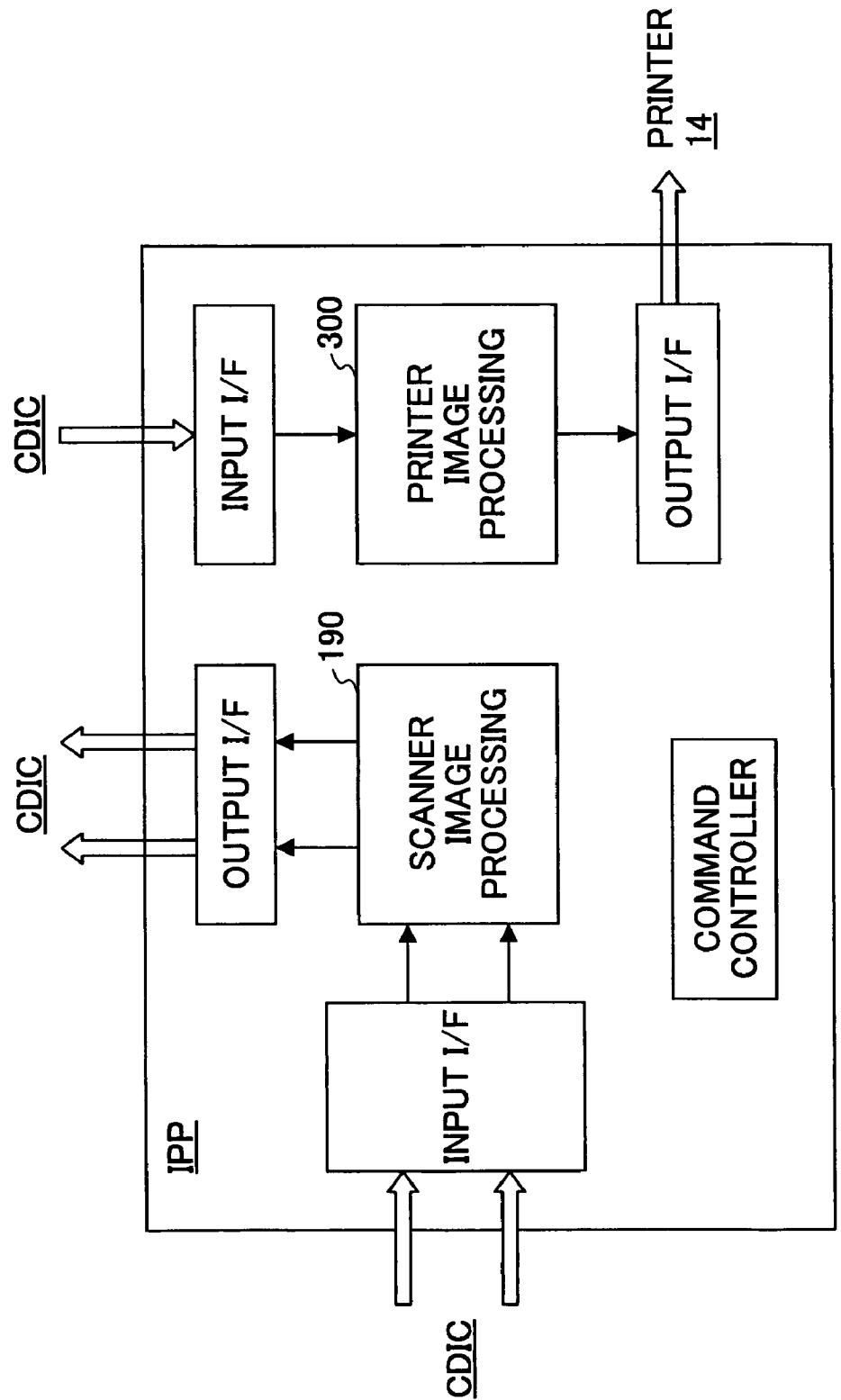
FIG. 8 is a block diagram illustrating functions of an image data processor shown in FIG. 2

FIG. 8 illustrates a schematic functional block diagram of the IPP. Read image are transmitted from an input I/F (interface) of the IPP to the "scanner image processing" 190 through the SBU and CDIC. In the "scanner image processing" 190, which is performed for compensating for degradation of read image signals, shading correction and scanner gamma correction of the data are performed, and the data are transferred to the MEM or the HDD to be held therein. The image data held in the MEM or the HDD are read out and transferred back to the IPP through the CDIC. In the IPP, a "background removal correction" is performed. Then, "image quality control" 300 is performed.

Figure 9:
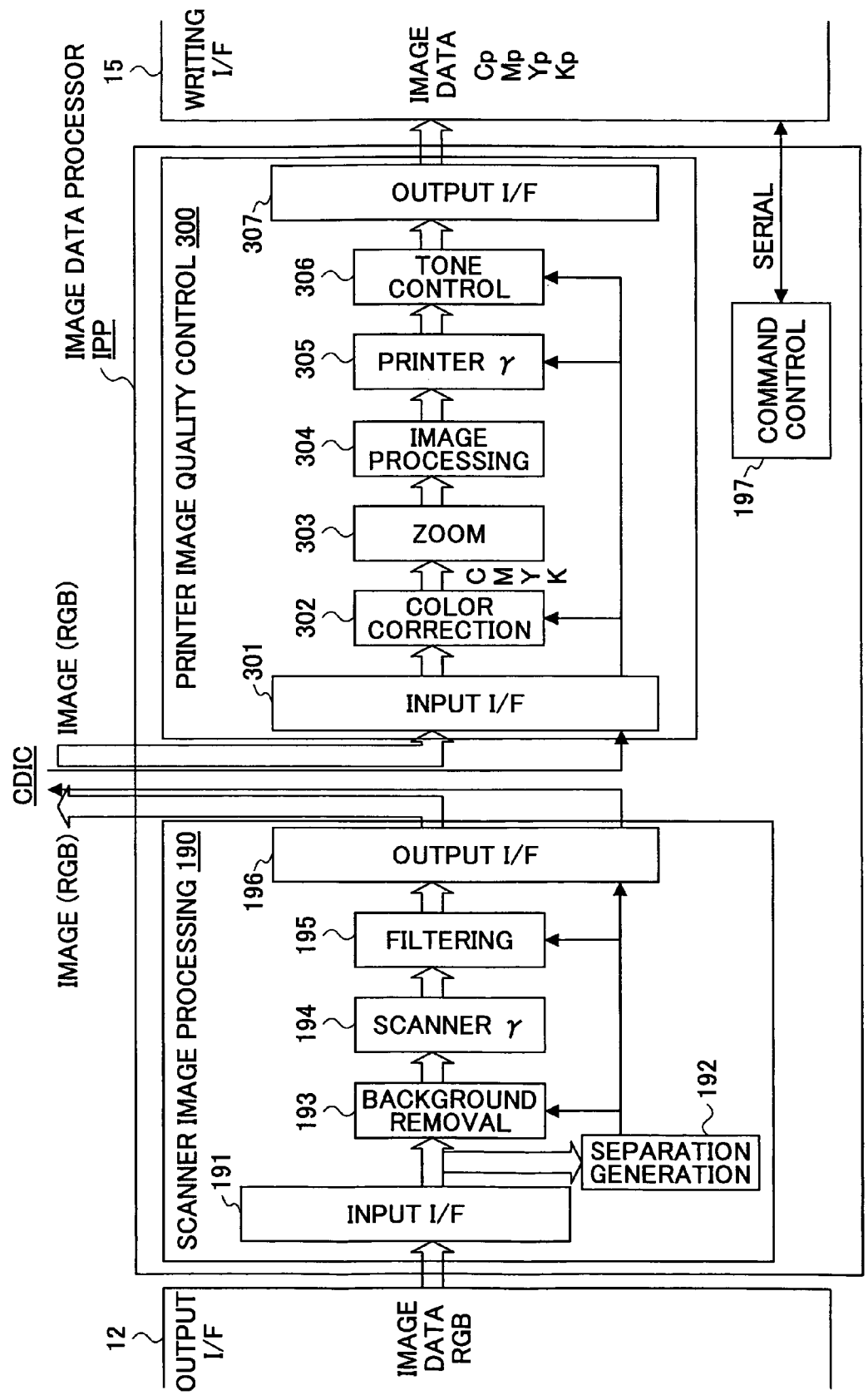
FIG. 9 is a block diagram illustrating functions of scanner image processing and printer image quality processing shown in FIG. 8.

FIG. 9 illustrates a detailed functional block diagram of the IPP. The IPP performs separation/generation 192 for determining text area and photo area of an image (image area separation), background removal 193, scanner gamma conversion 194, filtering 195, color correction 302, zoom 303, image processing 304, printer gamma conversion 305, and tone control 306. The IPP is a programmable arithmetic processing unit for processing images. The image data input from the output I/F of the scanner 10 to the CDIC are transferred to the IPP through the CDIC. Then, the IPP compensates for signal degradation (degradation of scanner related signals) due to quantization of optical and digital signals of the image data, and the image data are output (transmitted) back to the CDIC. The IPP performs "image quality control" on the image data returned to the IPP from the CDIC. In the "image quality control" 300, the color correction 302 for converting RGB signals to YMCK signals, the zoom 303, the image processing 304, the printer gamma conversion 305, and the tone control 306 such as tone conversion, dithering and error diffusion are performed.

Figure 10:
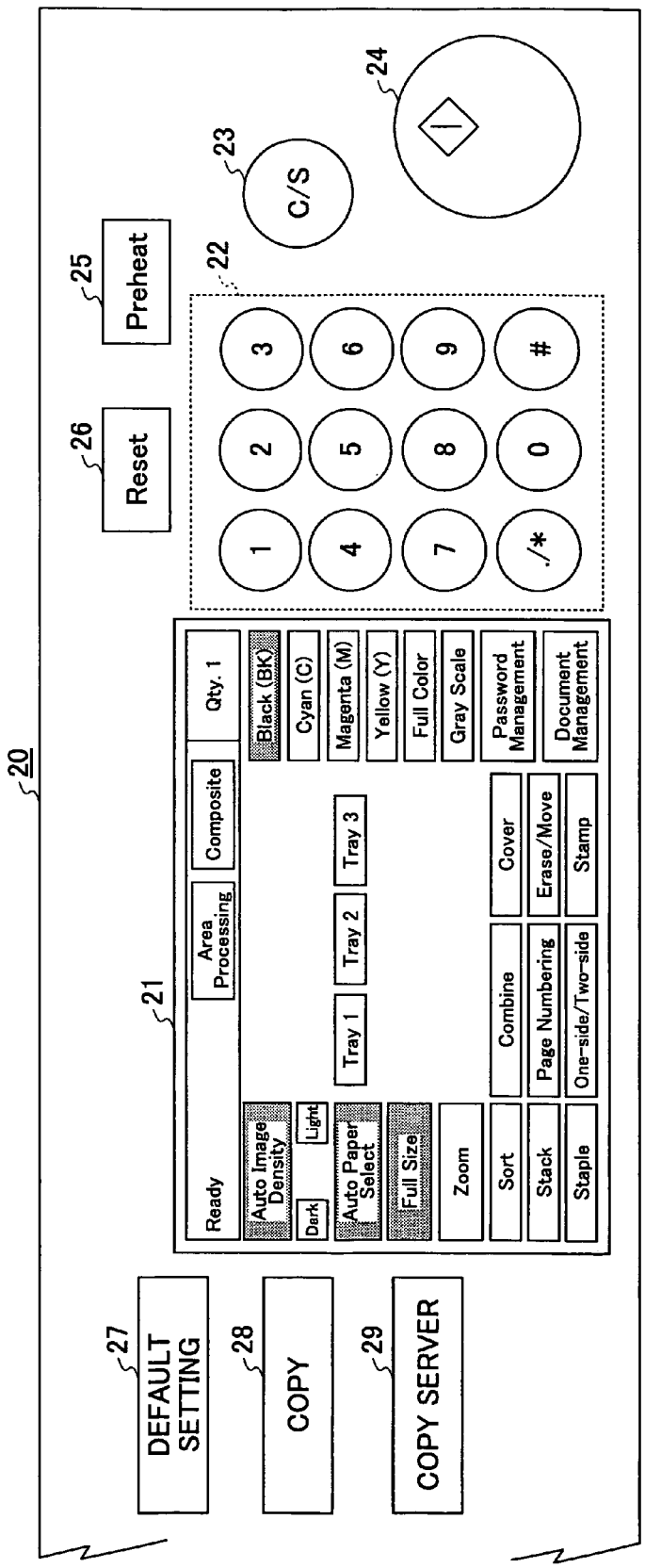
FIG. 10 is an enlarged plan view of a part of an operations board shown in FIGS. 2 and 3.
Figure 12:
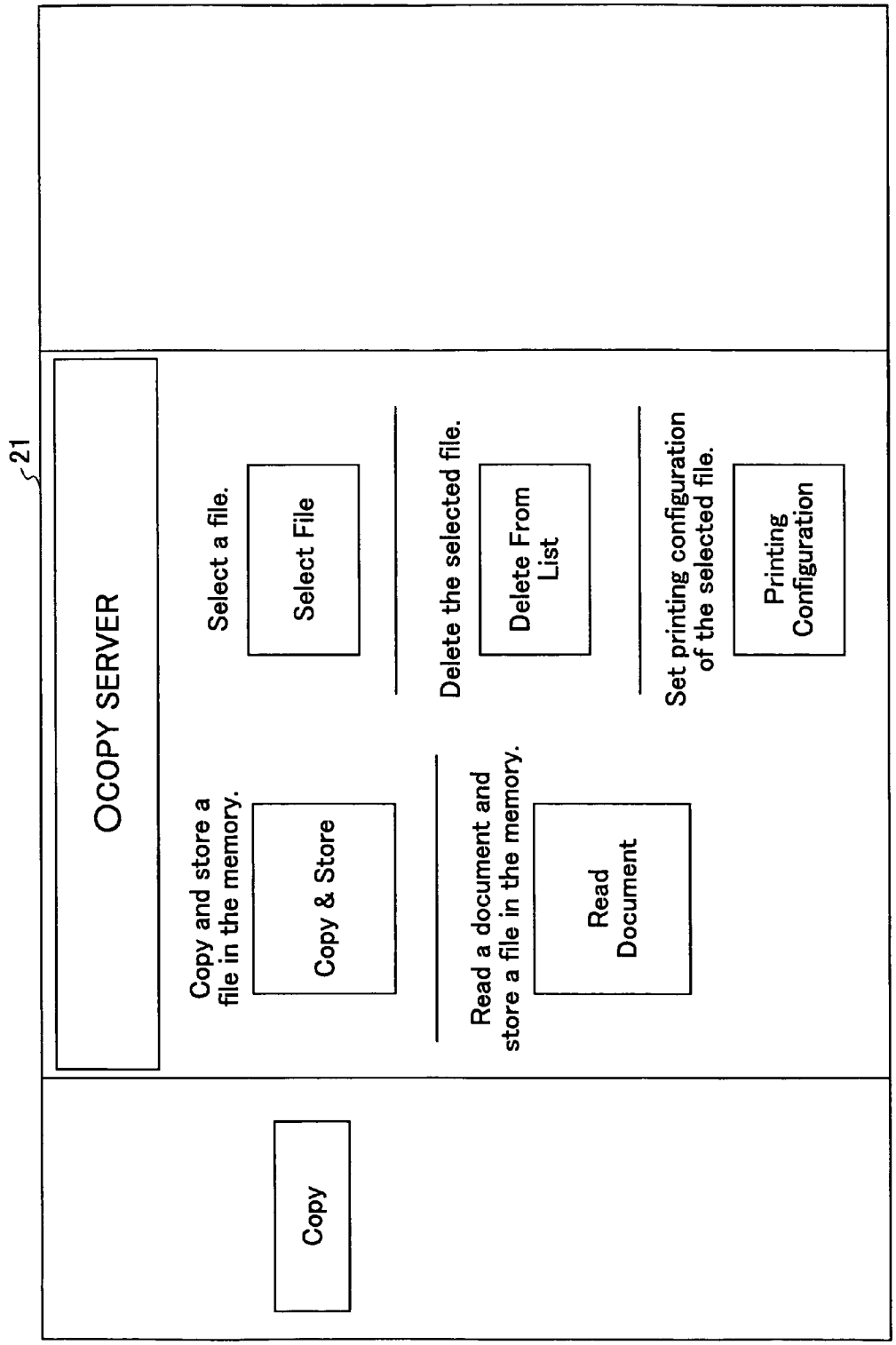
FIG. 12 is an enlarged plan view of a "copy server" entry screen displayed on a liquid crystal touch panel shown in FIG. 10.

FIG. 10 shows a part of an operations panel face of the operations board 20. The operations board 20 is provided with a liquid crystal touch panel 21, a numeric keypad 22, a clear/stop key 26, a default setting key 27, a copy key 28, and a copy server key 29. The liquid crystal touch panel 21 shows function keys, the number of sets to be copied, and a message indicating the state of the image forming apparatus. The default setting key 27 is pressed when a user customizes the default setting of the apparatus. The user can specify the size of paper stored in the apparatus or customize the state that is set when a mode clear key of a copier function is pressed. The user can also specify an application to be selected when no operation is performed for a predetermine period of time, specify the time to be set in a low-power mode according to International Energy Star Program, and specify time to be set in an auto-off/sleep mode. When a preheat key 25 is pressed, the apparatus is switched from a standby state to a power reduction state so as to lower the fixing temperature and turn off the light of the operations section. The preheat state corresponds to a low-power state of the International Energy Star Program. When the preheat key 25 is pressed again, the preheat state and an off state/sleep state are cleared and switched to the standby state. The user can use the copier function by pressing the copy key 28. The copy server key 29 is used for editing (copy mode setting, printing, deleting) existing stored image data. On the liquid crystal touch panel 21 shown in FIG. 10, a default screen for copy condition entry screen is displayed. If the "copy server" key 29 is touched while this entry screen is displayed, the screen displayed on the liquid crystal touch panel 21 is switched to a copy server function selection screen as shown in FIG. 12. If a "copy" key displayed on the copy server function selection screen is touched, the screen displayed on the liquid crystal touch panel 21 is switched from the copy server function selection screen to the previous copy condition entry screen (FIG. 10). The copy server function is described below in greater detail.

Figure 11:
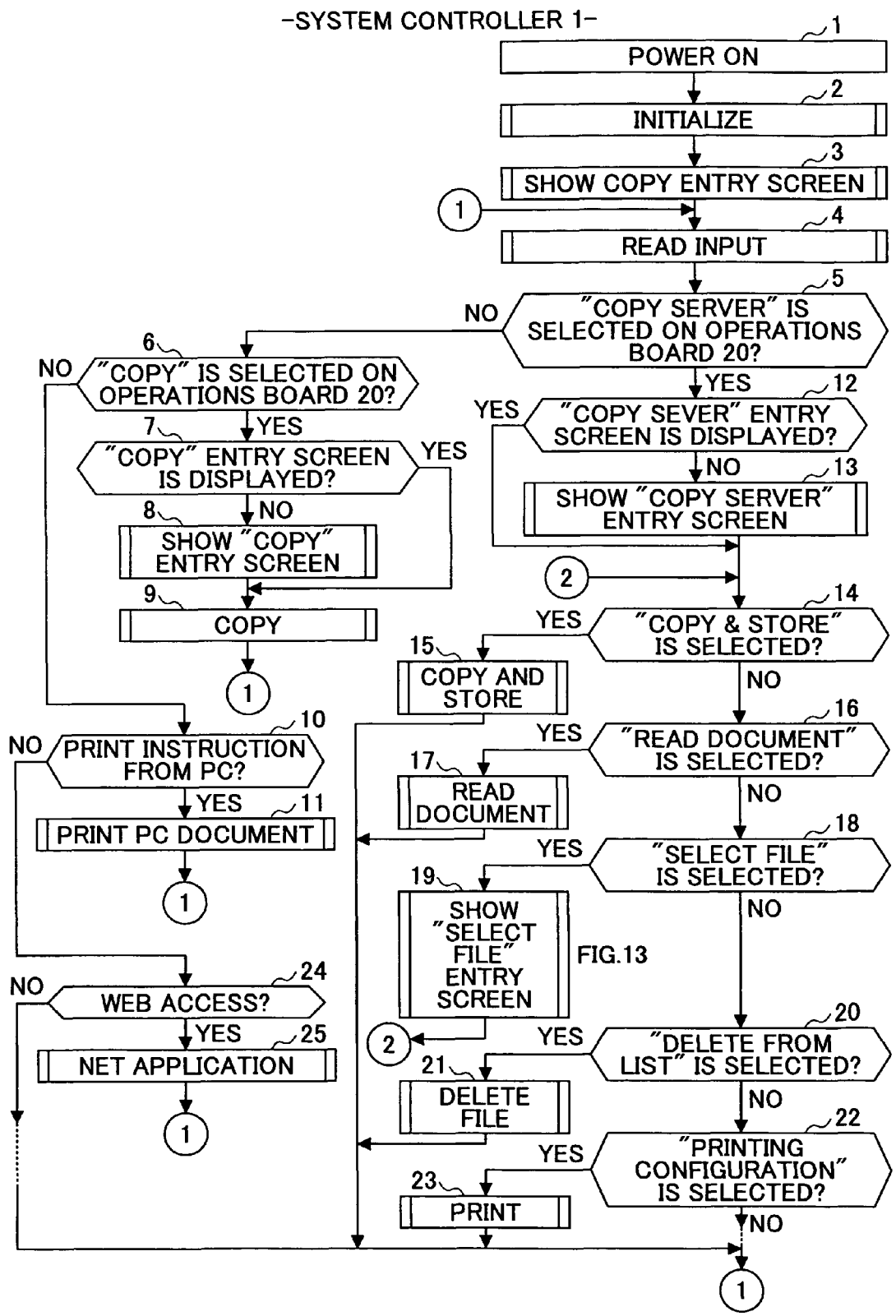
FIG. 11 is a flowchart illustrating an image processing control by a system controller and the image memory access controller.

FIG. 11 illustrates the overview of image processing control by the system controller 1 of FIG. 2. When the copy machine MF1 is powered on, an operating voltage is applied from a power supply circuit (not shown) (step 1). The system controller 1 performs initialization in response to the power-on (step 2). An entry standby screen of a copy mode, which is set as the default, as shown in FIG. 10 is displayed on the liquid crystal touch panel 21 through a CPU (not shown) of the operations board 20.

In the following description, only the step number is shown in the parenthesis without adding the word "step". Although the system controller 1 reads inputs on the operations board 20 and switches the screens displayed on the operations board 20 through the CPU within the operations board 20, the phrase "through the CPU" is omitted in the following description and simply expressed as "the operations board 20 performs . . . ".

In the following "input reading" (4), the user's input on the operations board 20 and the accesses from the personal computers PC1-PC3 and other personal computers connected through the network (these devices may be collectively called "external devices") are read. A copy condition input, if any, is read, and copy operation control (5-9) is performed when a start key 24 is pressed. In this copy operation control, image data read from the document scanner 10 are temporarily held by the MEM or the HDD for making a specified number of copies, and automatically erased when the specified number of copies are made. If a print instruction of a document is received from an external device such as a personal computer, the document is received and printed out (10, 11). As with the above operation, document data are temporarily held by the MEM or the HDD for making a specified number of copies, and automatically erased when the specified number of copies are made.

If the "copy server" key 29 is touched, the operations board 20 switches the screen displayed on the liquid crystal touch panel 21 to the "copy server" function selection screen of FIG. 12 (5, 10, 11). The screen shows a "copy & store" key for reading a document with the document scanner 10, storing data in the HDD, and specifying a copy mode for printing out with the printer 14, a "read document" key for reading a document with the document scanner 10 and storing data into the HDD, a "select file" key for displaying a text/image file list stored in the HDD, and a "printing configuration" key for (displaying an entry screen for) setting printing configuration. If the start key 24 is pressed while an entry screen for setting printing configuration is displayed, printing is started according to the printing configuration displayed on the entry screen. If a "copy" key displayed on the screen is pressed, the screen returns to the entry screen of the copy mode (FIG. 10).

If the user touches the "copy & store" key, the operations board 20 displays a "copy & store" entry screen on the liquid crystal touch panel 21. The "copy & store" entry screen is the same as the copy condition entry screen displayed on the liquid crystal touch panel 21 of FIG. 10 except that a "storage option" key is added. If the user touches the "storage option" key, the operations board 20 pops up a "storage option" entry screen on the liquid crystal touch panel 21. On the "storage option" entry screen, the user can select whether to encode (compress) image data, and select the file format (TIFF/PDF). In default, data are compressed and stored as a TIFF file. An image data format representing images is determined by a choice of "black", "cyan", "magenta", "yellow", "full color", or "gray scale" on the copy condition entry screen. If "black", "cyan", "magenta", or "yellow" is selected, a recording color is selected. If "gray scale" is selected, multiple tones (multilevel image data) are selected. For example, if "black" is selected and "gray scale" is not selected, binary image data in one color "black" is selected. If "black" and "gray scale" are selected, multilevel image data in one color "black" are selected. The same applies when any one of "cyan", "magenta", or "yellow" is selected. If "full color" is selected, full-color multilevel image data are selected regardless of whether "gray scale" is selected. If two of "black", "cyan", "magenta", and "yellow" are selected, multilevel image data are selected regardless whether "gray scale" is selected. Combinations of the above "storage option" and the data format available on the operations board 20 are shown in Table 1.

TABLE 1

| Case | Original Image Data | Data Format Compression | File Format |
|---|---|---|---|
| A | one-color binary data (One of Bk, C, M or Y is selected, Gray scale is not selected) | Yes (MH) | TIFF |
| B1 | one-color multilevel data (One of Bk, C, M or Y is selected, Gray scale is selected) | No | TIFF or PDF |
| B2 | one-color multilevel data (One of Bk, C, M or Y is selected, Gray scale is selected) | Yes (JPEG) | PDF |
| C1 | two-color multilevel data (Two of Bk, C, M or Y are selected, Gray scale is selected) | No | TIFF or PDF |
| C2 | two-color multilevel data (Two of Bk, C, M or Y are selected, Gray scale is selected) | Yes (JPEG) | PDF |
| D1 | multicolor multilevel data (Full color is selected) | No | TIFF or PDF |
| D2 | multicolor multilevel data (Full color is selected) | Yes (JPEG) | PDF |

Referring to Case A in Table 1, one of "black", "cyan", "magenta", and "yellow" is selected, and "gray scale" is not selected. With this selection, binary image data in one-color binary are generated. In this case, because the data volume of binary image data can be reduced by compression and encoding, and because the encoding can be securely performed, the binary image data are compressed and encoded in an MH format and stored in the HDD. Although both TIFF and PDF are applicable for storing the encoded data as a file, TIFF is employed because of its high versatility. Referring to Cases B1 and B2, one color is selected, and "gray scale" is also selected. With this selection, one-color multilevel image data are generated. In Case B1 where compression and encoding are not performed, both TIFF and PDF are applicable for storing the data as a file, and therefore both TIFF and PDF are available. In Case B2 where compression and encoding in a JPEG format are performed, only PDF is available. This is because the data cannot be stored as a TIFF file (or because a common personal computer cannot read the data stored as a TIFF file). In Cases C1 and C2, two-color multilevel image data are selected. In Case C1 where the two-color multilevel image data are not compressed or encoded, both TIFF and PDF are available. In Case C2 where compression and encoding in a JPEG format are performed, only PDF is available. This is because the data cannot be stored as a TIFF file (or because a common personal computer cannot read the data stored as a TIFF file). In Cases D1 and D2, full-color (four colors of "black", "cyan", "magenta", and "yellow") is selected. In Case D1 where the full-color multilevel image data are not compressed or encoded, both TIFF and PDF are available. In Case D2 where compression and encoding in a JPEG format are performed, only PDF is available. This is because the data cannot be stored as a TIFF file (or because a common personal computer cannot read the data stored as a TIFF file).

If a combination of a data format and a file format other than combinations shown in Table 1 is input, the operations board 20 displays a popup warning to indicate that the input is not valid, and specifies the item to be changed for enabling the input. For example, in Case B2, if TIFF is selected as the file format, the operations board 20 displays a warning message indicating that TIFF is not available, and "gray scale" needs to be canceled to select the TIFF.

When the start key 24 is pressed, the system controller 1 starts a copy operation and stores image data from the document scanner 10 as a file in the HDD according to the selected storage options (Table 1) using the IMAC (15).

If the user touches the "read document" key on the copy server screen (FIG. 12), the operations board 20 displays a "read document" entry screen on the liquid crystal touch panel 21. The "read document" entry screen is the same as the copy condition entry screen displayed on the liquid crystal touch panel 21 of FIG. 10 except that a printout related key block is hidden and the "storage option" key is added. If the user touches the "storage option" key, the operations board 20 pops up the "storage option" entry screen on the liquid crystal touch panel 21. The storage option (data format and file format) can be set as in the case of the above-described "copy & store" (Table 1). When the start key 24 is pressed, the system controller 1 starts reading a document and stores image data from the document scanner 10 as a file in the HDD according to the selected storage options using the IMAC (Table 1) (17).

Figure 13:
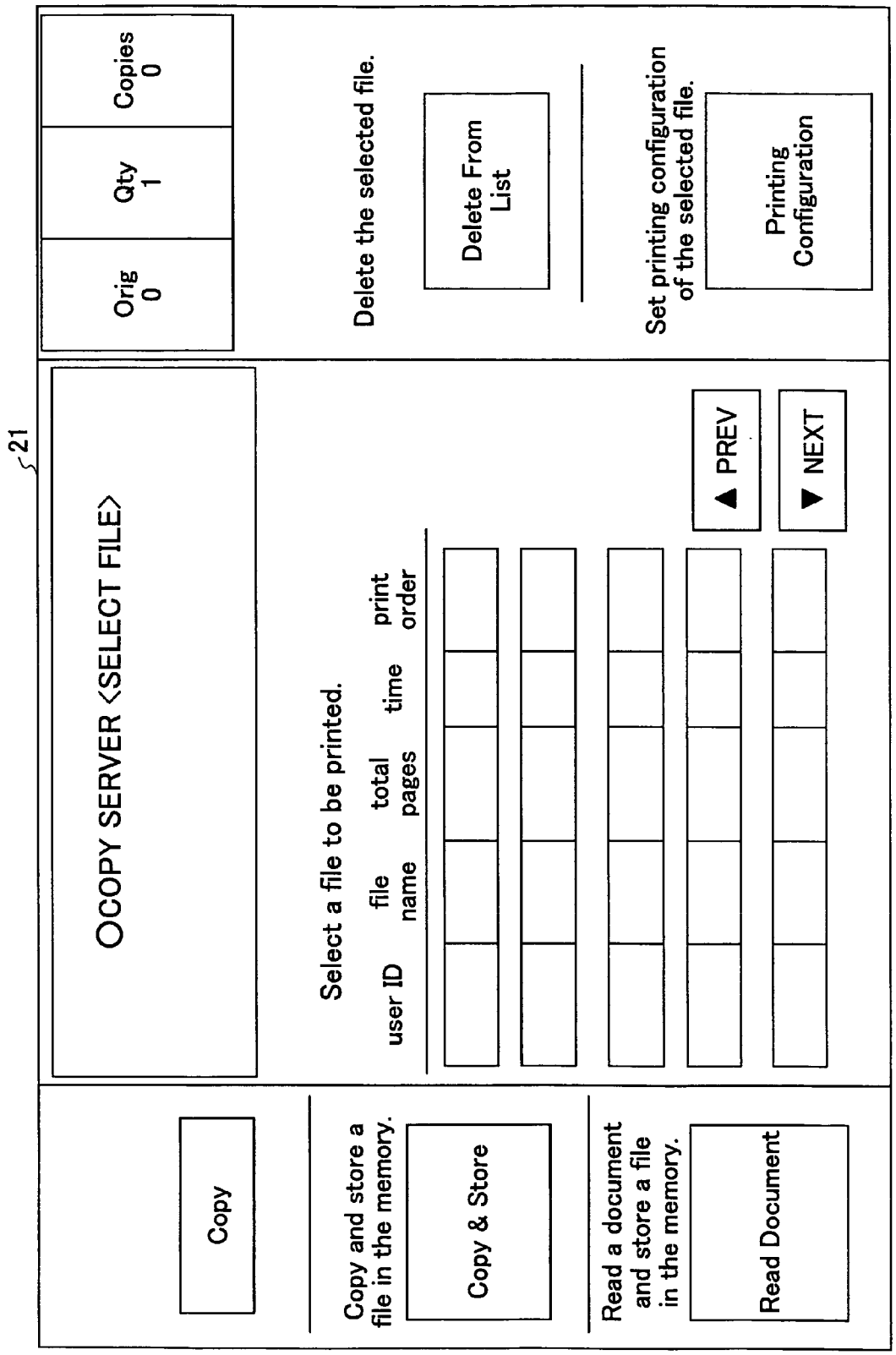
FIG. 13 is an enlarged plan view of a "select file" entry screen displayed on the liquid crystal touch panel shown in FIG. 10.

If the user touches "select file" key on the copy server screen (FIG. 12), the operations board 20 displays a "select file" entry screen on the liquid crystal touch panel 21 (18, 19). FIG. 13 shows an example of the "select file" entry screen. A list of text/image files stored in the HDD is displayed on the liquid crystal touch panel 21. The job can be changed by pressing any button on the touch panel 21. Each of the files stored in the HDD is listed with a user ID, the file name, the number of pages, and time in one line. The file name is attached when the image is stored. The number of pages represents the number of stored document images. The time represents the time when the image is stored. In the example shown in FIG. 13, only five lines are displayed. To show image/text information files not displayed, a "prev" key or a "next" key serving as a scroll key is pressed. If the lines displayed on a display area are pressed, the pressed lines are highlighted and selected. One or more text/image information files can be selected. There are "delete from list" and "printing configuration" keys available for the text/image files on the list. If the "delete from list" key is pressed after selecting a text/image information file on the list, the selected file is deleted. If the "printing configuration" key is pressed after selecting a text/image information file on the list, the printing configuration entry screen appears on the touch panel 21. By pressing the start key 24 after setting the printing configuration, images of the selected file can be printed out according to the set printing configuration (22, 23).

If a WWW (World Wide Web) access is made by an external device such as a personal computer via the network, the network controller 178 (including a WWW server, an FTP server, a DSN server, and an authentication sever) executes "Net application" (25) for providing the text/image information file to Internet Explorer (or to a personal computer in which Internet Explorer is installed), serving as a WWW browser, included as a standard application in Microsoft Windows (24, 25).

Figure 14:
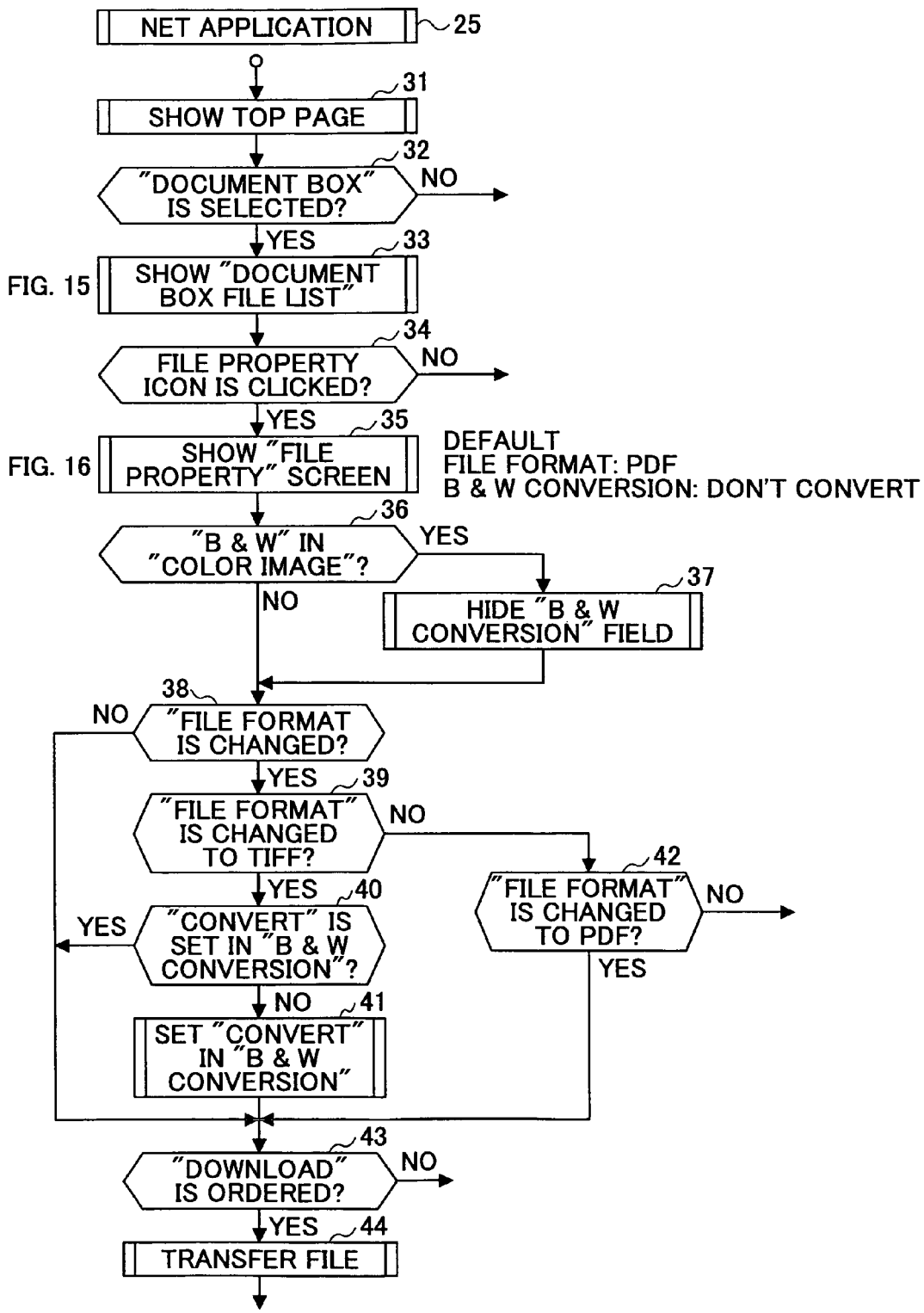
FIG. 14 is a flowchart showing a part of network delivery control of text/image information performed by a network controller shown in FIG. 7 with use of server software.

FIG. 14 illustrates operations of the "Net application" (25). In response to an URL access from a personal computer, information for displaying a top page for stored information delivery is sent to the personal computer. When the personal computer receives the information, a WWW browser thereof (which is also referred to as a "Web browser"; Internet Explorer is used in this embodiment) shows the top page on a display connected to the personal computer. In other word, the network controller 178 shows the top page on the display of the personal computer (31).

The network controller 178 also sends browser screen information as HTML data, for example, to the personal computer according to a request from the Web browser of the personal computer such that displayed contents can be controlled at the browser (personal computer) side. These operations are realized using script information (JavaScript, for example,) for screen operations sent together with the HTML data, which are commonly used by Web browsers for displaying information. When buttons are pressed, corresponding requests are transmitted from the personal computer to the network controller 178. In response, switching of screen information or transmission of download file information is performed. These operations utilize the HTTP protocol, which is a basic network protocol and widely used in Internet environments.

The top page shows a block for entering a user (user of the PC1) ID and a password as well as menu items. When the user enters an ID and a password registered in the MF1 and presses an enter key on the keyboard or clicks on the login button on the top page, the PC1 sends the entered information to the MF1. In response, the MF1 sends display control information for activating the menu items on the top page to the PC1, so that the menu items on the top plate are activated (or ready to accept input). In other words, when the user enters the ID and password registered in MF1 and clicks on the login button, the network controller 178 activates the menu items on the top page shown on the display of the PC1.

If the user selects "document box", which is one of the menu items, the network controller 178 shows a "document box file list" (FIG. 15) on the display of the personal computer (32, 33). This list shows text/image information files to which access is permitted based on the combination of the user ID and the password (user rank) stored in the HDD. If property icons 72 of text/image information files are clicked on in the "document box file list" of FIG. 15, the screen jumps to corresponding property screens shown in FIGS. 16-18. In FIG. 15, four files are shown, each with the file name, functions, the property icon 72, creation date, the number of pages, and the presence of a password in this order from the left side. Each of the icons at the right side in functions fields indicates a color mode of the corresponding file. From the top of the list, the icons indicate black-and-white (black binary image data), two-color (two-color multilevel image data), one-color (cyan, magenta, or yellow binary image data), and full-color (R, G, B full-color multilevel image data or Y, M, C, Bk full-color image data; multilevel image data with converted color coordinates).

Figure 16:
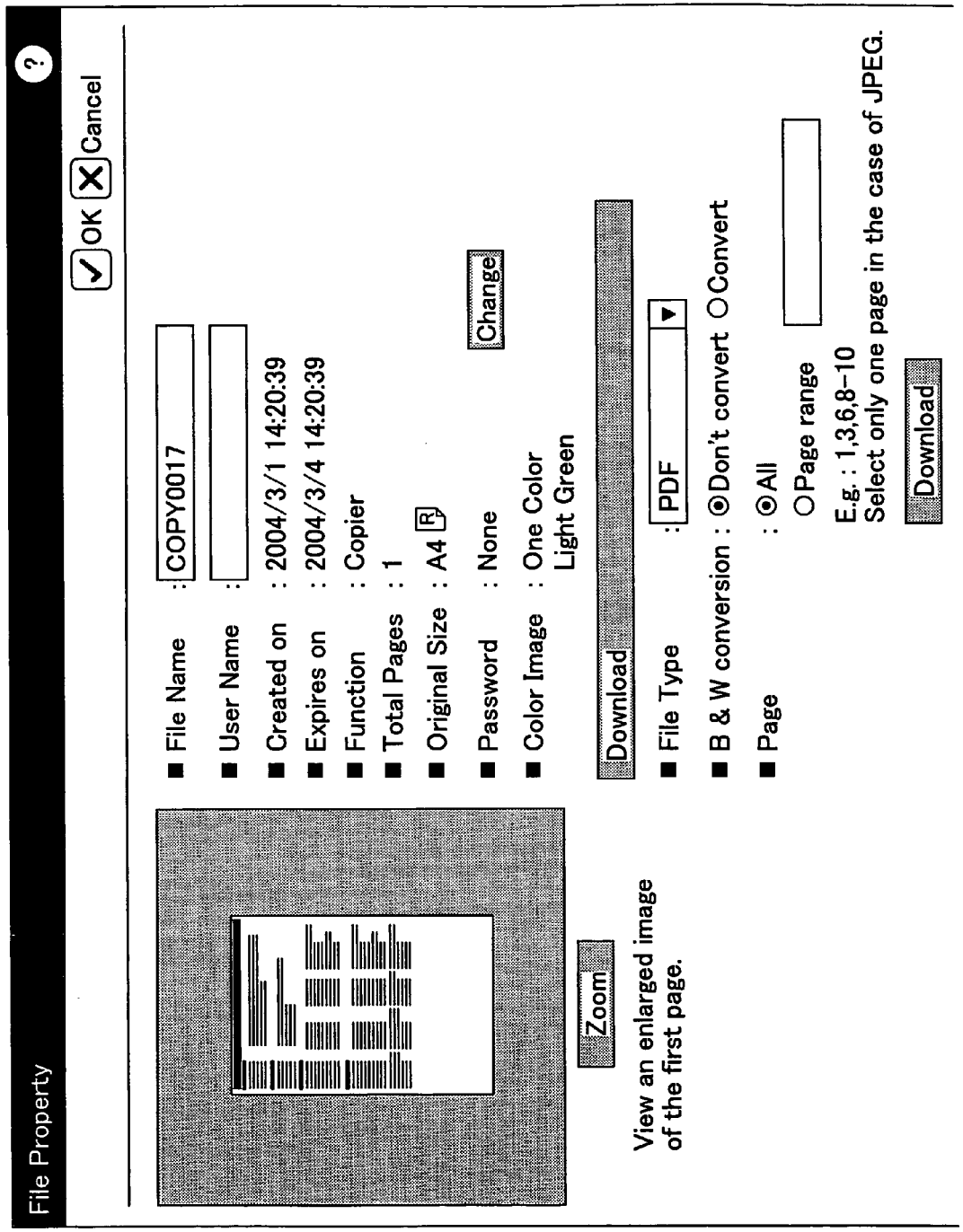
FIG. 16 is a plan view illustrating an example of a file property screen displayed by the network controller on a display of a personal computer provided as a user terminal in response to a click on a property icon of one of the text/image files on the "document box file list" of FIG. 15.

FIG. 16 shows a property information screen which is displayed when a property button of the second file COPY0017 from the bottom of the list of FIG. 15 is selected. On the property information screen, items from the file name to the number of pages and the password indicate management information. Items including the document size and the color image indicate attribute information. A "download" field is a user option field, including a file format selection field, a field for a black-and-white conversion (conversion from multilevel image data to binary image data; the color is not limited to black), and a page field. With a "download" button under this user option field, the user can order the network controller 178 to transmit the text/image information file after the selection is completed.

In the first embodiment, the user can select either one of TIFF or PDF in the file format selection field, in which "PDF" is selected by default. Also, the user can select either one of "Convert" or "Don't convert" for "black-and-white conversion" in the data format selection field, in which "Don't convert" is selected by default. When the user clicks the property icon 72 of any one of the text/image information files, the network controller 178 displays a corresponding file property screen, on which "PDF" and "Convert" are selected in the file format selection field and the data format selection ("black-and-white conversion") field, respectively (34, 35). If the attribute of the text/image information file is black-and-white or one-color, i.e., binary image data, the network controller 178 hides the data format selection field or the "black-and-white conversion" field because there is no need to select (36, 37).

The user can select the file format (PDF/TIFF) and the data format conversion (conversion from multilevel image data to binary image data). If TIFF is selected, the network controller 178 sets the data format conversion ("black-and-white conversion" field) to "Convert" (38-41). If the selection is changed from "TIFF" to "PDF", which is available to both data formats (PDF images are openable by Internet Explorer on the personal computer), the network controller 178 waits for a download instruction (42, 43). Then, when the user clicks the "download" button, the network controller 178 reads out the corresponding text/image information file from the HDD. If "Convert" is selected in the "black-and-white" conversion field and the image data are multilevel image data, the network controller 178 converts the file to binary image data in the selected file format and sends the converted file to the personal computer. On the other hand, if the text/image information file is already in the selected file format and data format, the text/image information file read out from the HDD is sent to the personal computer without performing any conversion.

Figure 17:
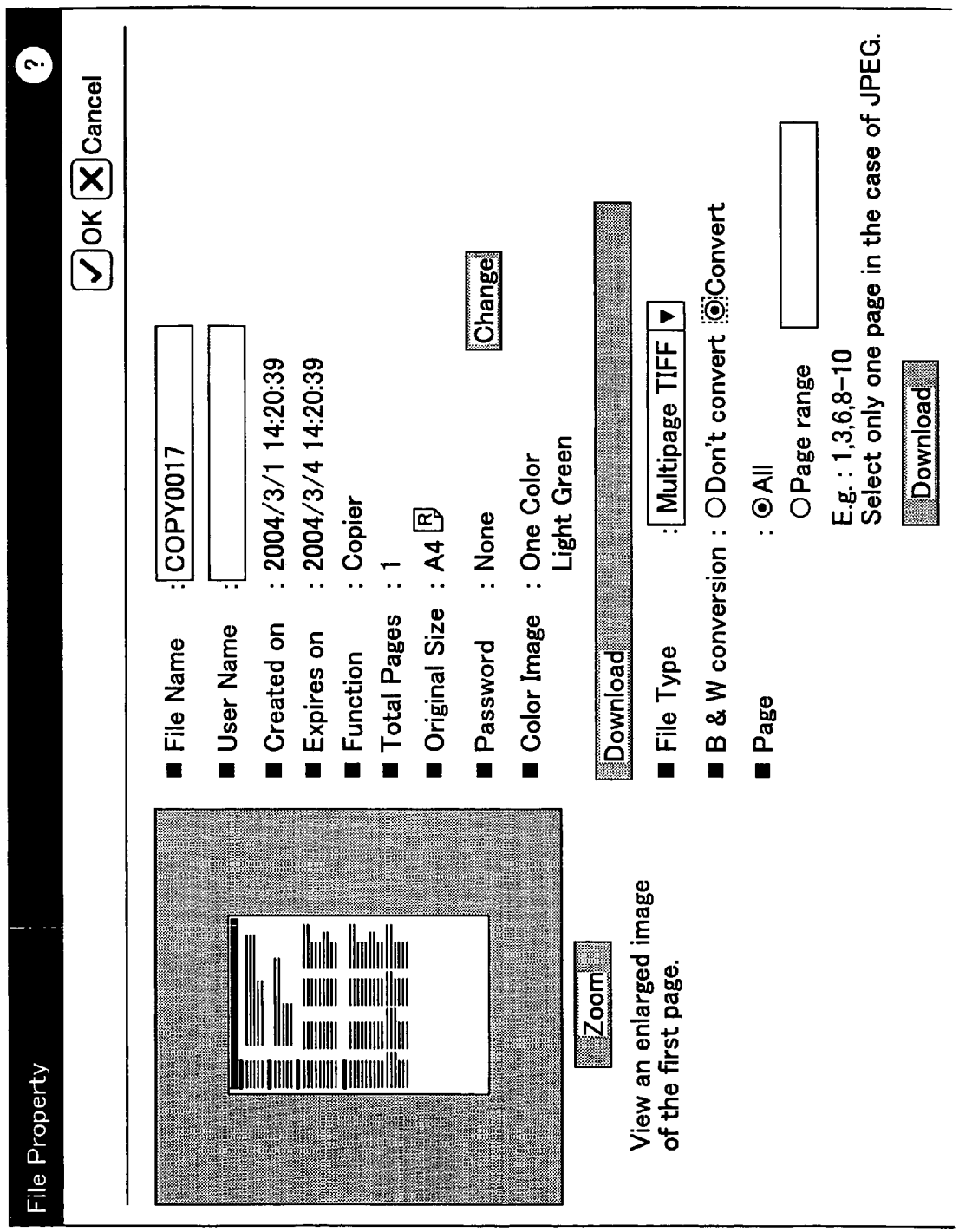
FIG. 17 is a plan view illustrating another example of the file property screen.
Figure 18:
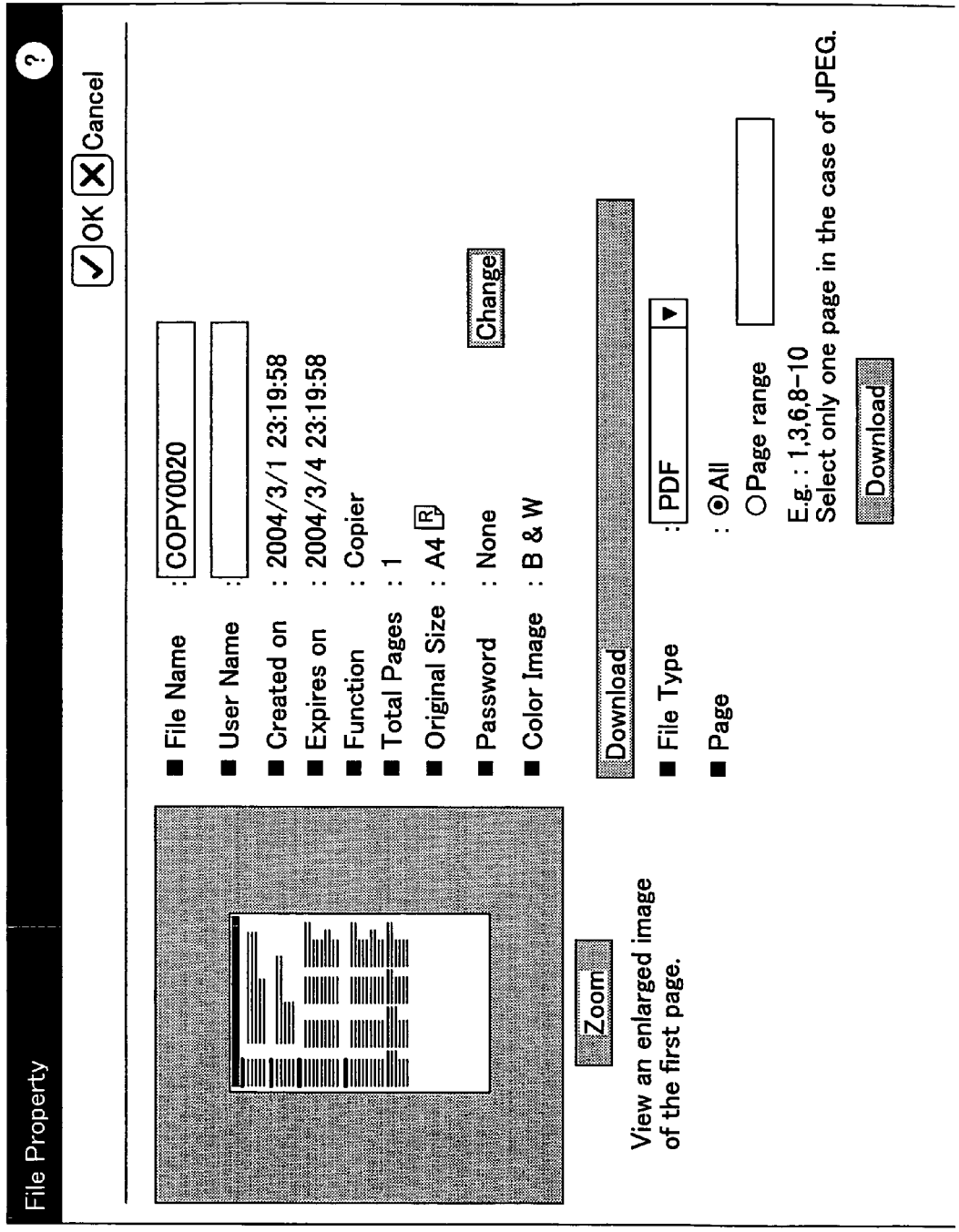
FIG. 18 is a plan view illustrating still another example of the file property screen.

For example, a "color image" field of the ninth item from the top of the screen of FIG. 16 indicates that the image is in one color and the color is light green (multilevel image data). Because this is not a black-and-white image (binary image data), the user can specify the file format and select either "Convert" or "Don't convert" in the black-and-white conversion field (or specify whether to convert to binary image data) in the download field. The user can select multipage TIFF as the file format from a pull-down menu, although PDF is selected by default. By pressing the download button after the selection is completed, the file is downloaded according to the selections. FIG. 17 shows a screen on which the download file format is changed from PDF to multipage TIFF and "Convert" is selected for the black-and-white conversion. As in this case, even if the file is not black-and-white image (one-color binary data), the file can be downloaded in TIFF and the image can be opened on the display by selecting "multipage TIFF" as the file format and "Convert" for the black-and-white conversion. In the case of the file COPY0017 containing color images, PDF is selected as the file format and "Don't convert" is selected for the black-and-white conversion in default as shown in FIG. 16. If the file format is changed to TIFF format as shown in FIG. 17, the black-and-white conversion is automatically changed to "Convert" according to the file format change. If the property icon 72 of a file COPY0020 shown in FIG. 15, which is a black-and-white image file, is clicked on, the screen jumps to a property screen shown in FIG. 18. Because the file is a black-and-white image, the black-and-white conversion field is hidden.

Second Embodiment

Although the hardware configuration of a second embodiment is the same as that of the first embodiment, a "Net application" executed by the network controller 178 in the second embodiment is slightly different from that in the first embodiment.

Figure 19:
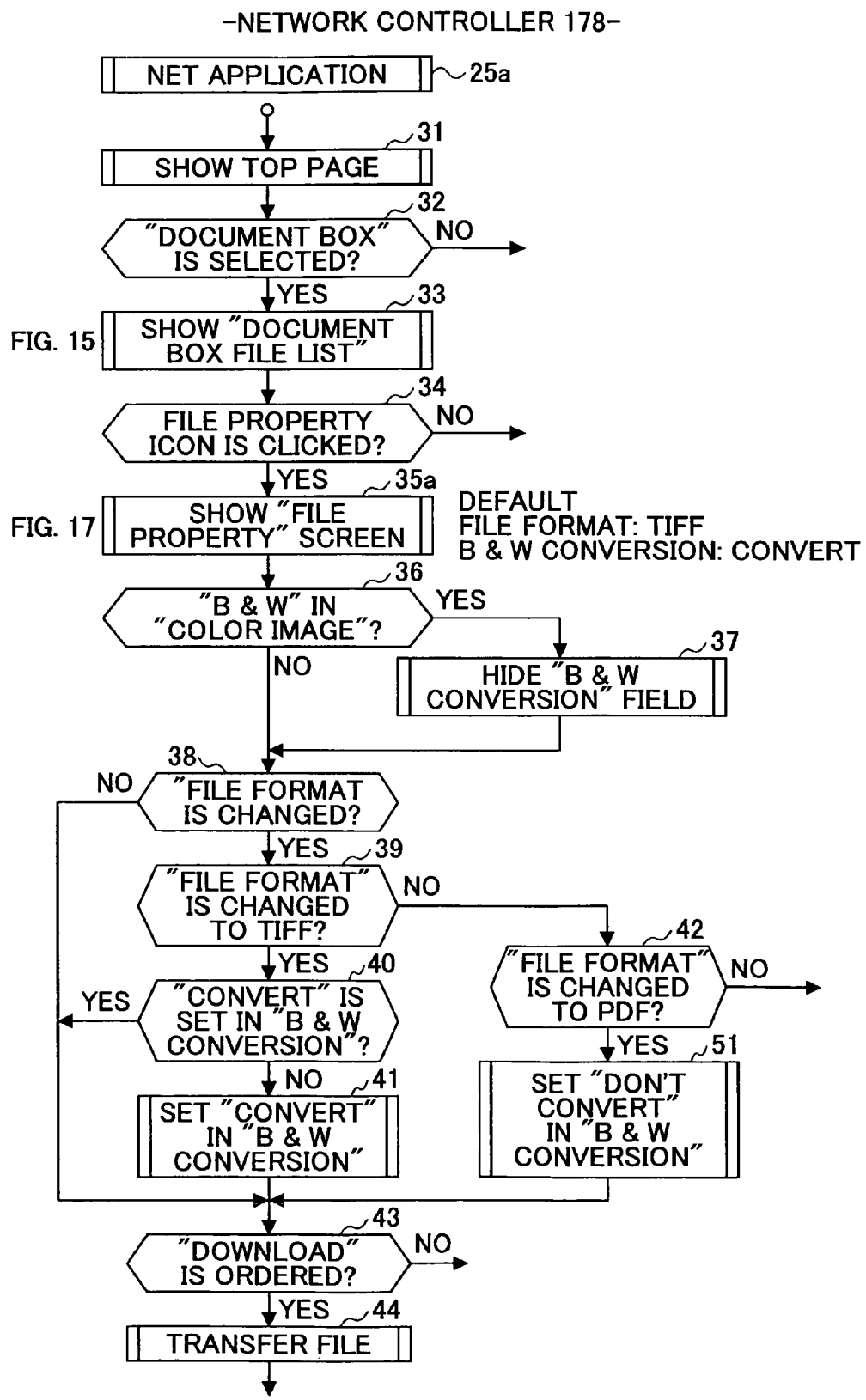
FIG. 19 is a flowchart showing a part of network delivery control of text/image information performed by a network controller of a text/image storage device as a second embodiment of the present invention with use of server software.

FIG. 19 illustrates operations of the "Net application" (25a) executed by the network controller 178 according to the second embodiment. When the user clicks on the property icon 72 of any one of the text/image information files, the network controller 178 of the second embodiment displays a corresponding file property screen, on which "TIFF" and "Convert" are selected in the file format selection field and the data format selection ("black-and-white conversion") field, respectively (34, 35a). If the selection is changed from "TIFF" to "PDF", which is available to both data formats (PDF images are openable by Internet Explorer on the personal computer), "Don't convert" is selected in the data format selection ("black-and-white" conversion) field and the network controller 178 waits for a download instruction (42, 51, 43). Other operations are same as the first embodiment.

Third Embodiment

Although the hardware configuration of a third embodiment is the same as that of the first embodiment, a "Net application" executed by the network controller 178 in the third embodiment is slightly different from that in the first embodiment.

Figure 20:
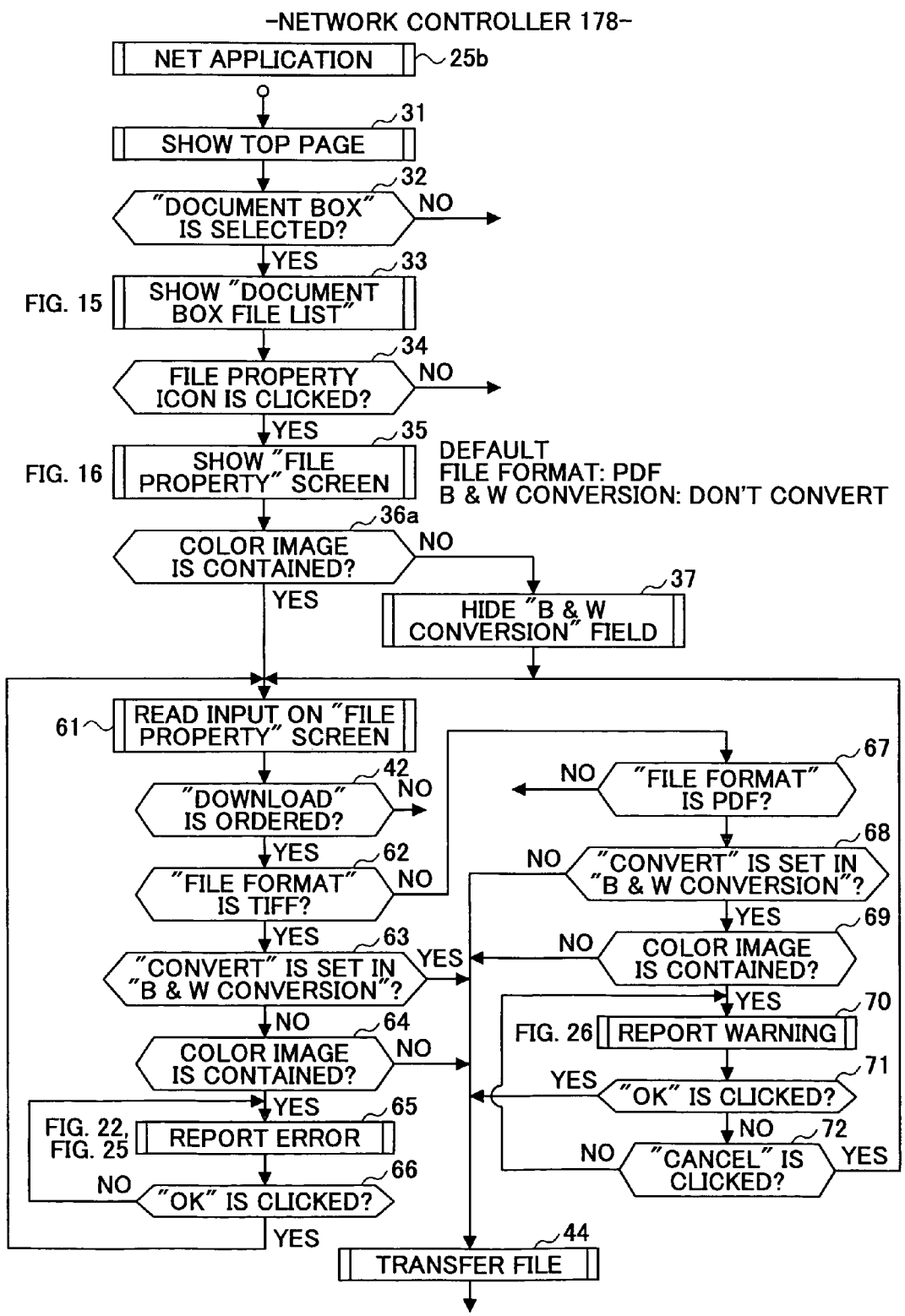
FIG. 20 is a flowchart showing a part of network delivery control of text/image information performed by a network controller of a text/image storage device as a third embodiment of the present invention with use of server software.

FIG. 20 illustrates operations of the "Net application" (25b) executed by the network controller 178 according to the third embodiment. When the user clicks on the property icon 72 of any one of the text/image information files, the network controller 178 of the third embodiment displays a corresponding "file property" screen. A "color image" field in attribute information on this "file property" screen indicates the presence or absence of color images (multilevel image data) in the third embodiment, while the "color image" field indicates "black-and-white" (binary image data) or the color (multilevel image data) in the first and second embodiments. On the property screen displayed in response to the click on the property icon 72 of any one of the text/information files, "PDF" and "Don't convert" are selected in the file format selection field and the data format selection ("black-and-white conversion") field, respectively, (35) as in the first embodiment. Displayed information and selection information are updated in response to user's inputs on the document property screen (61). When the "download" button is clicked on, the network controller 178 checks the combination of the selected file format and data format, and reports an error (65) or reports a warning (70) if the combination is not available.

Figure 21:
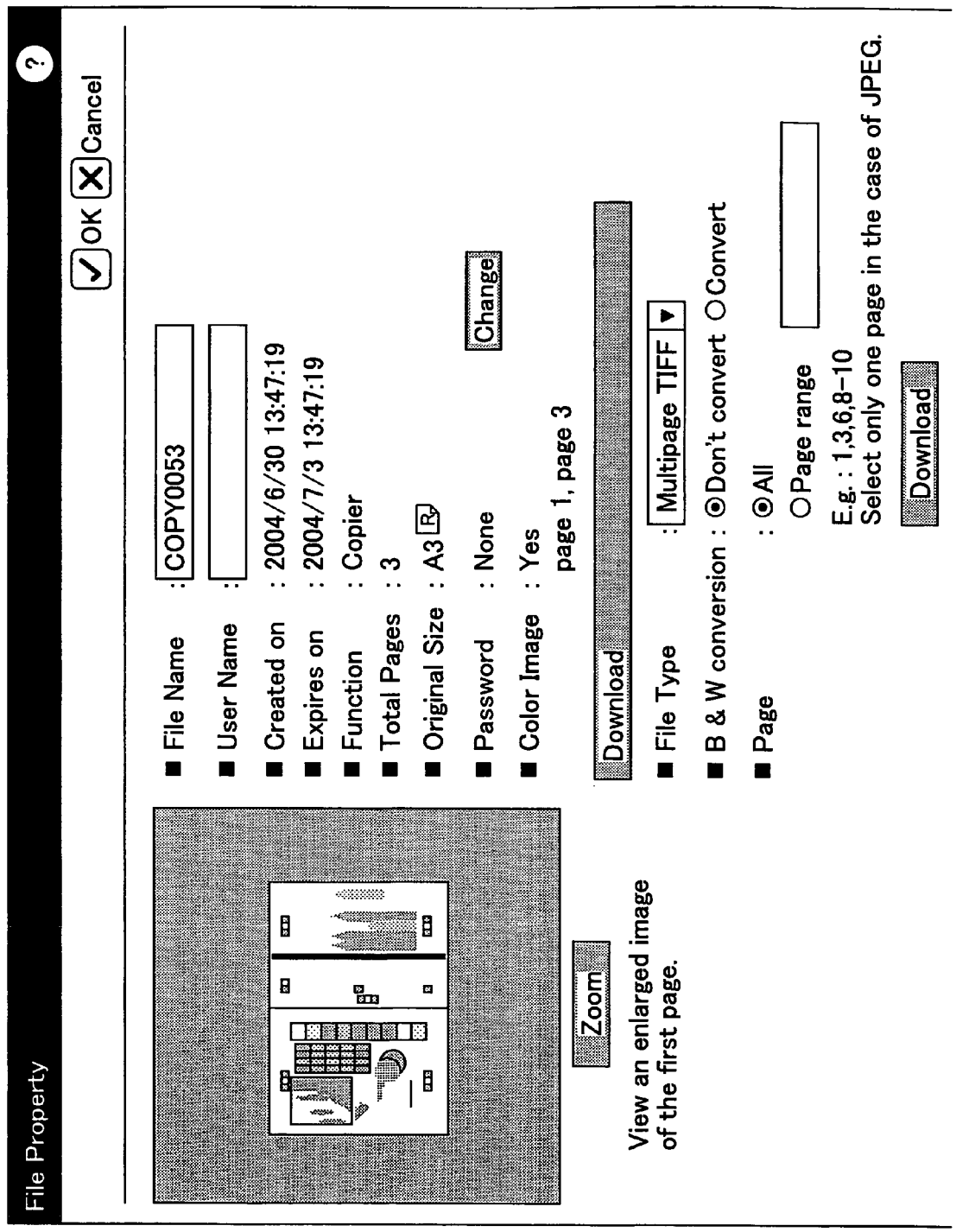
FIG. 21 is a plan view illustrating an example of a file property screen displayed by the network controller of the text/image storage device as the third embodiment of the present invention on a display of a personal computer provided as a user terminal.
Figure 22:
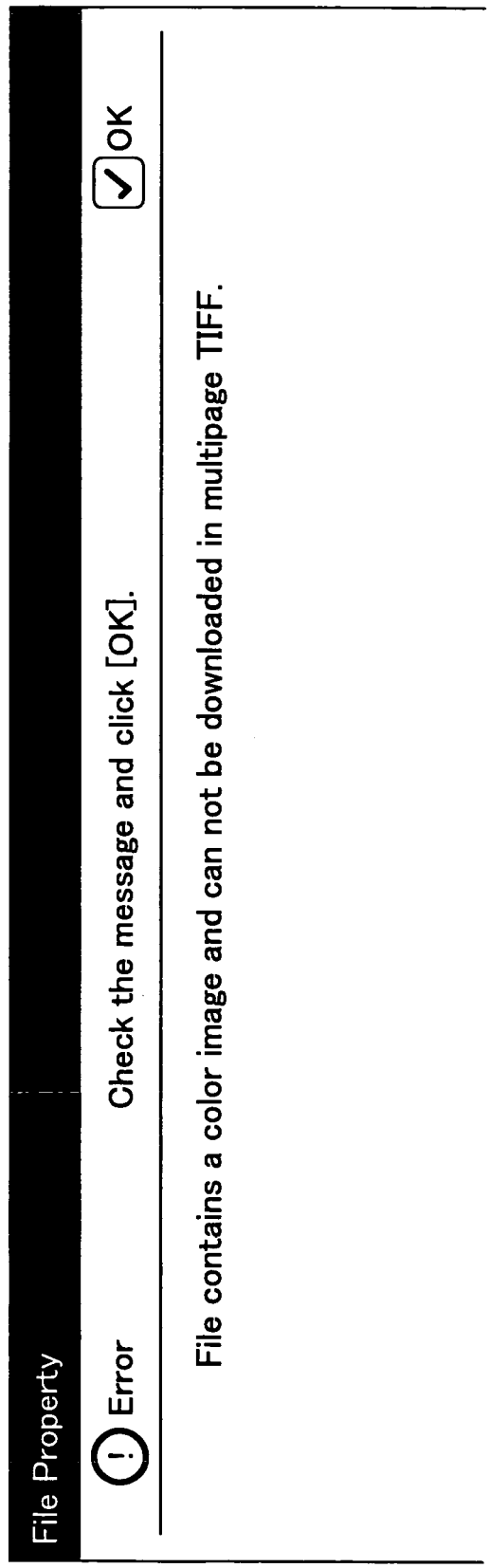
FIG. 22 is a plan view of an error report screen displayed by the network controller of the text/image storage device as the third embodiment of the present invention on a display of a personal computer provided as a user terminal.

With reference to FIG. 21, when the download file format is changed from PDF to multipage TIFF and "Don't convert" is selected for the black-and-white conversion, the file cannot be downloaded in TIFF (the image cannot be opened on the display of the personal computer or cannot be used). Therefore, an error message as shown in FIG. 22 is displayed in order to inform the user that the file containing color images cannot be downloaded (or used) (62-65). The user clicks "OK" and changes the selection. The operations do not proceed to a "transfer file" step (44) until the error is corrected. As shown in FIG. 21, on a file property screen of a file COPY0053 containing color images, a "color image" field indicates, by default, that the file contains a color image. With this information, the user can know that the file cannot be downloaded in multipage TIFF without performing the black-and-white conversion.

Figure 23:
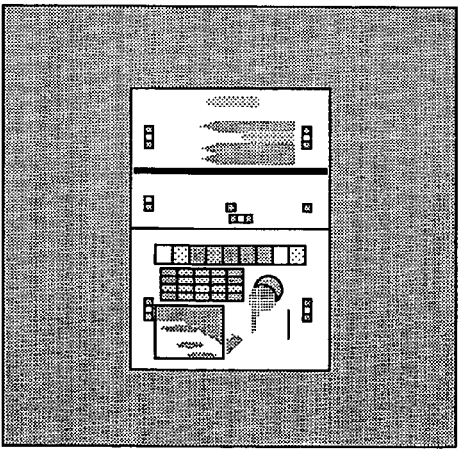
FIG. 23 is a plan view illustrating another example of the file property screen displayed by the network controller of the text/image storage device as the third embodiment of the present invention on a display of a personal computer provided as a user terminal.

A property screen illustrated in FIG. 23 shows not only the presence/absence of color images but also the pages containing the color images in the "color image" field. With this information, the user can know that the file cannot be downloaded (or used) in multipage TIFF without performing the black-and-white conversion of the indicated pages. In the example shown in FIG. 23, the default selections are "PDF" for the download file format, "Don't convert" for the black-and white conversion, and "All" for the page to be downloaded. If the user changes the selection in the "page" from "All" to "Page range" to specify page 2 and page 3 as the pages to be downloaded and changes the file format from PDF to multi TIFF because page 3 contains a color image, the selected pages can be download by changing the selection in the "black-and-white conversion" from "Don't convert" to "Convert" (62, 63, 44).

Figure 24:
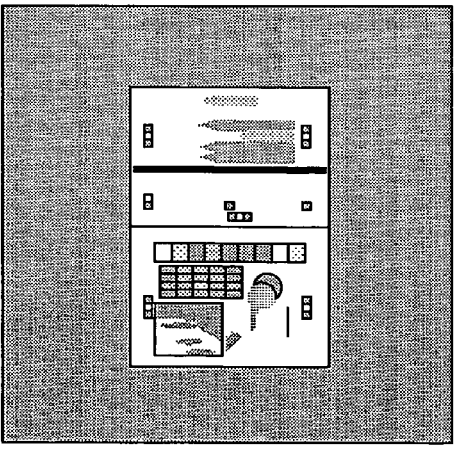
FIG. 24 is a plan view illustrating still another example of the file property screen displayed by the network controller of the text/image storage device as the third embodiment of the present invention on a display of a personal computer provided as a user terminal.
Figure 25:
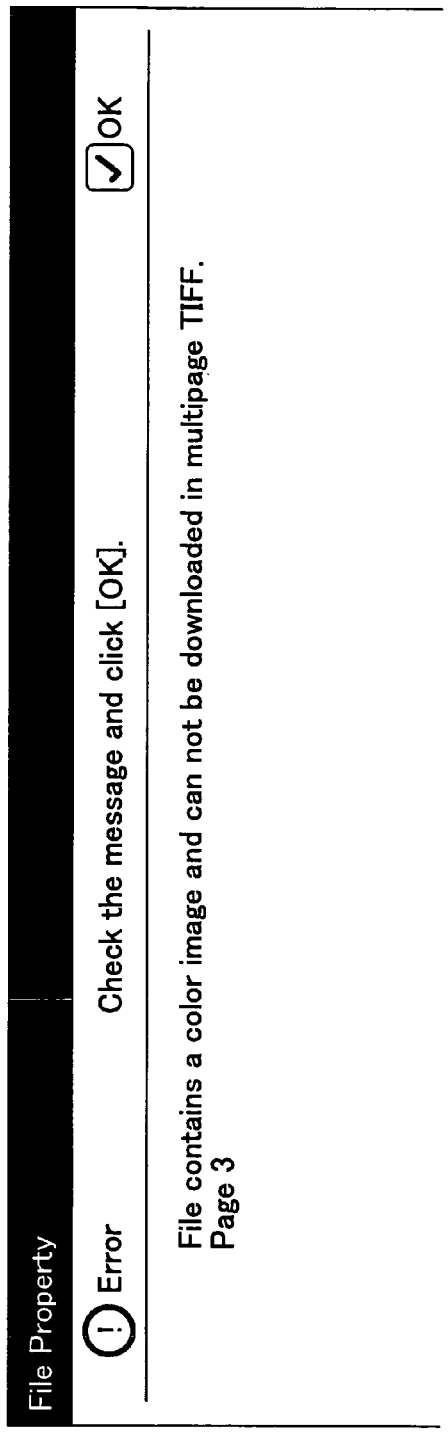
FIG. 25 is a plan view of another error report screen displayed by the network controller of the text/image storage device as the third embodiment of the present invention on a display of a personal computer provided as a user terminal.

With reference to FIG. 24, when the selection in the "black-and-white conversion" is changed from "Convert" to "Don't convert", the file cannot be downloaded in TIFF. Therefore, an error message as shown in FIG. 25 is displayed in order to inform the user that the file containing color images cannot be downloaded (62-65). This error message also indicates the pages containing the color images (FIG. 25).

In the case where "PDF" and "Convert" are selected for the file format and the black-and-white conversion, respectively, although a color image is contained, the selection of "PDF" might be meaningless because the color image (multilevel image data) is converted to binary image data. In view of that, the network controller 178 sends a warning (see FIG. 26) (67-70). If the user clicks "OK", the operations proceed to the "transfer file" step (44). Therefore, even in the case where "PDF" and "Convert" are selected for the file format and the black-and-white conversion although a color image is contained, the text/image information file is downloaded as a PDF file after multilevel image data are converted to binary image data (71-72, 44).

Fourth Embodiment

Although the hardware configuration of a fourth embodiment is the same as that of the third embodiment, a "Net application" executed by the network controller 178 in the fourth embodiment is slightly different from that in the third embodiment.

Figure 27:
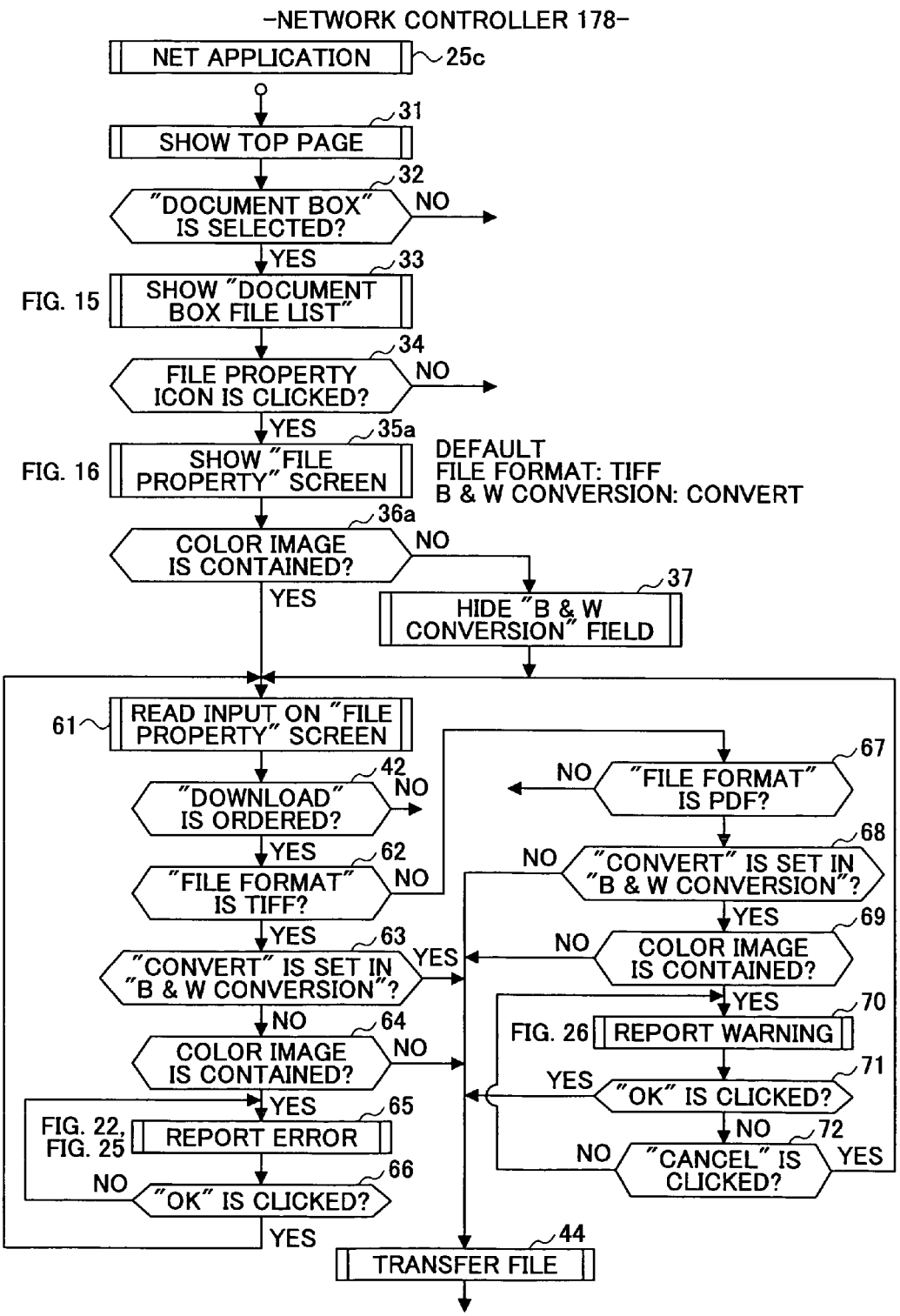
FIG. 27 is a flowchart showing a part of network delivery control of text/image information performed by a network controller of a text/image storage device as a fourth embodiment of the present invention with use of server software.

FIG. 27 illustrates operations of the "Net application" (25c) executed by the network controller 178 according to the fourth embodiment. When the user clicks the property icon 72 of any one of the text/image information files, the network controller 178 of the fourth embodiment displays a corresponding file property screen, on which "TIFF" and "Convert" are selected in the file format selection field and the data format selection ("black-and-white conversion") field, respectively (34, 35a). Other operations are same as the third embodiment.

Fifth Embodiment

Although the hardware configuration of a fifth embodiment is the same as that of the fourth embodiment, a "Net application" executed by the network controller 178 in the fifth embodiment is slightly different from that in the fourth embodiment.

Figure 26:
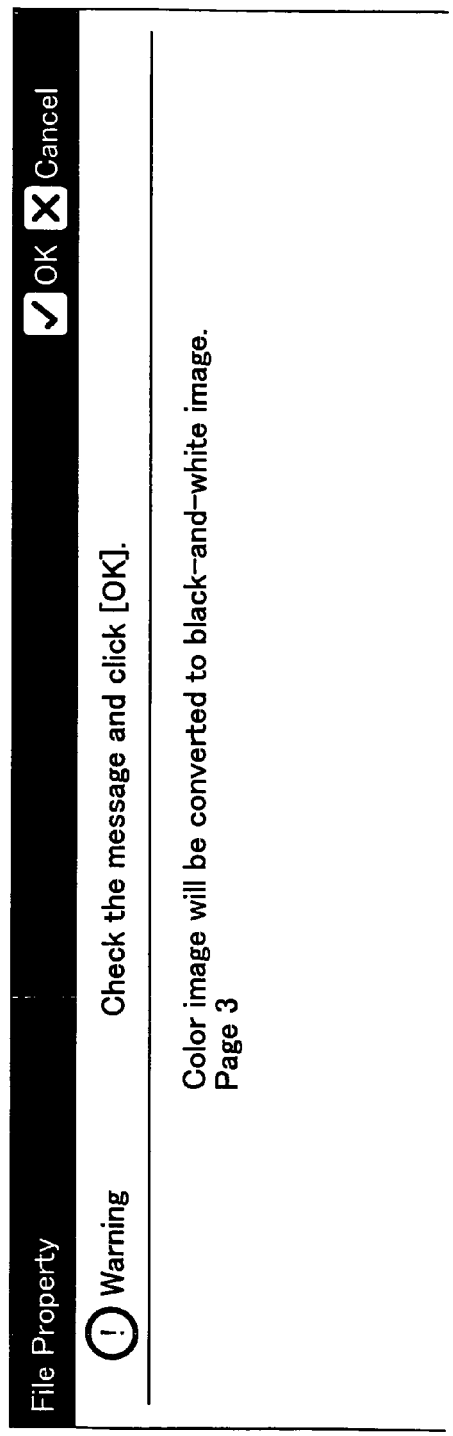
FIG. 26 is a plan view of a warning screen displayed by the network controller of the text/image storage device as the third embodiment of the present invention on a display of a personal computer provided as a user terminal.
Figure 28:
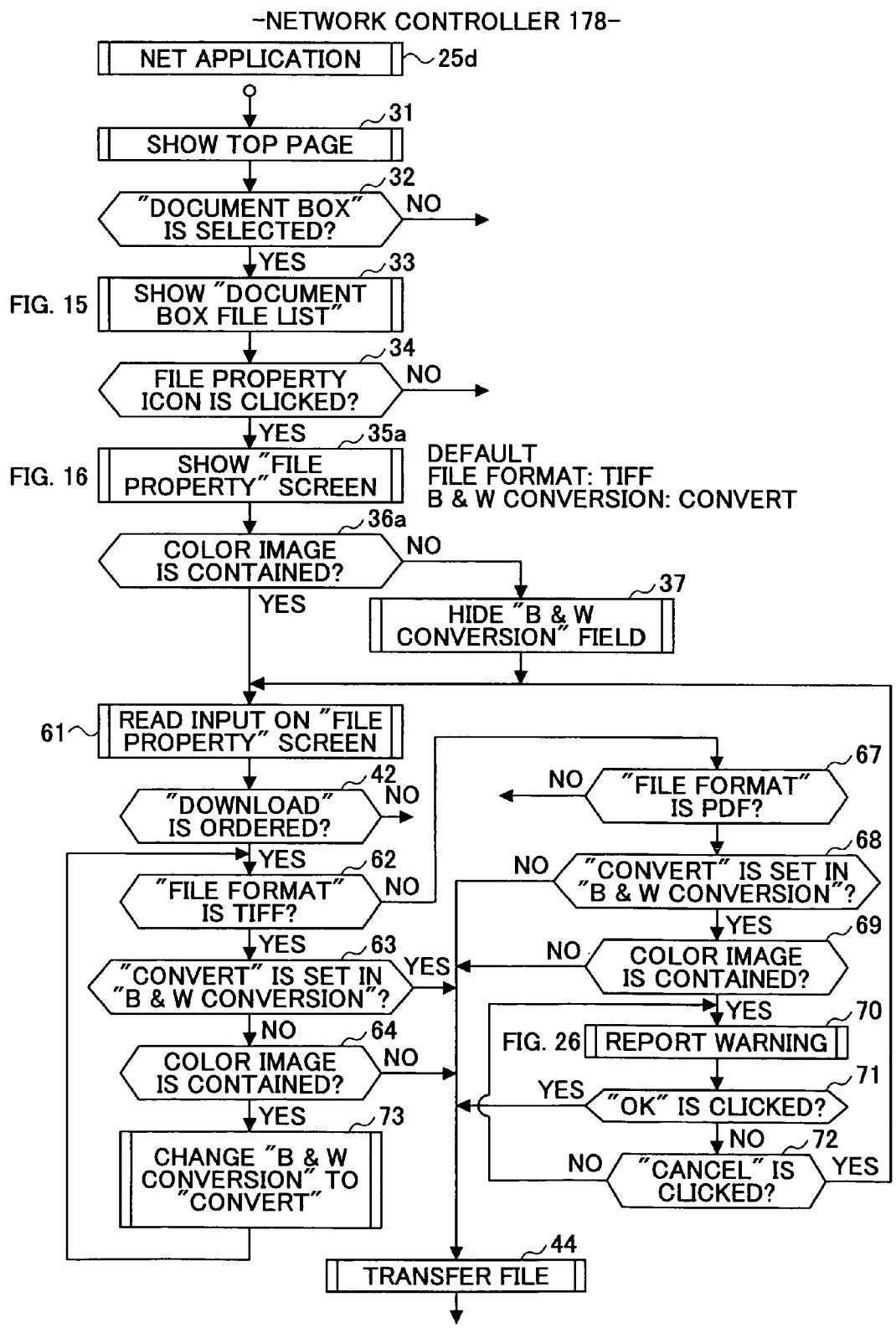
FIG. 28 is a flowchart showing a part of network delivery control of text/image information performed by a network controller of a text/image storage device as a fifth embodiment of the present invention with use of server software.

FIG. 28 illustrates operations of the "Net application" (25d) executed by the network controller 178 according to the fifth embodiment. In the third and fourth embodiments, when the selection in the "black-and-white conversion" is changed from "Convert" to "Don't convert", the error message as shown in FIGS. 25 and 26 is displayed because the file cannot be downloaded in TIFF. In the fifth embodiment, instead of showing the error message, the network controller 178 automatically changes the selection in the "black-and-white conversion" from "Don't convert" to "Convert" (73). Other operations are same as the first embodiment.

Sixth Embodiment

Although the hardware configuration of a sixth embodiment is the same as that of the first embodiment, a "Net application" executed by the network controller 178 in the sixth embodiment is slightly different from that in the first embodiment.

Figure 29:
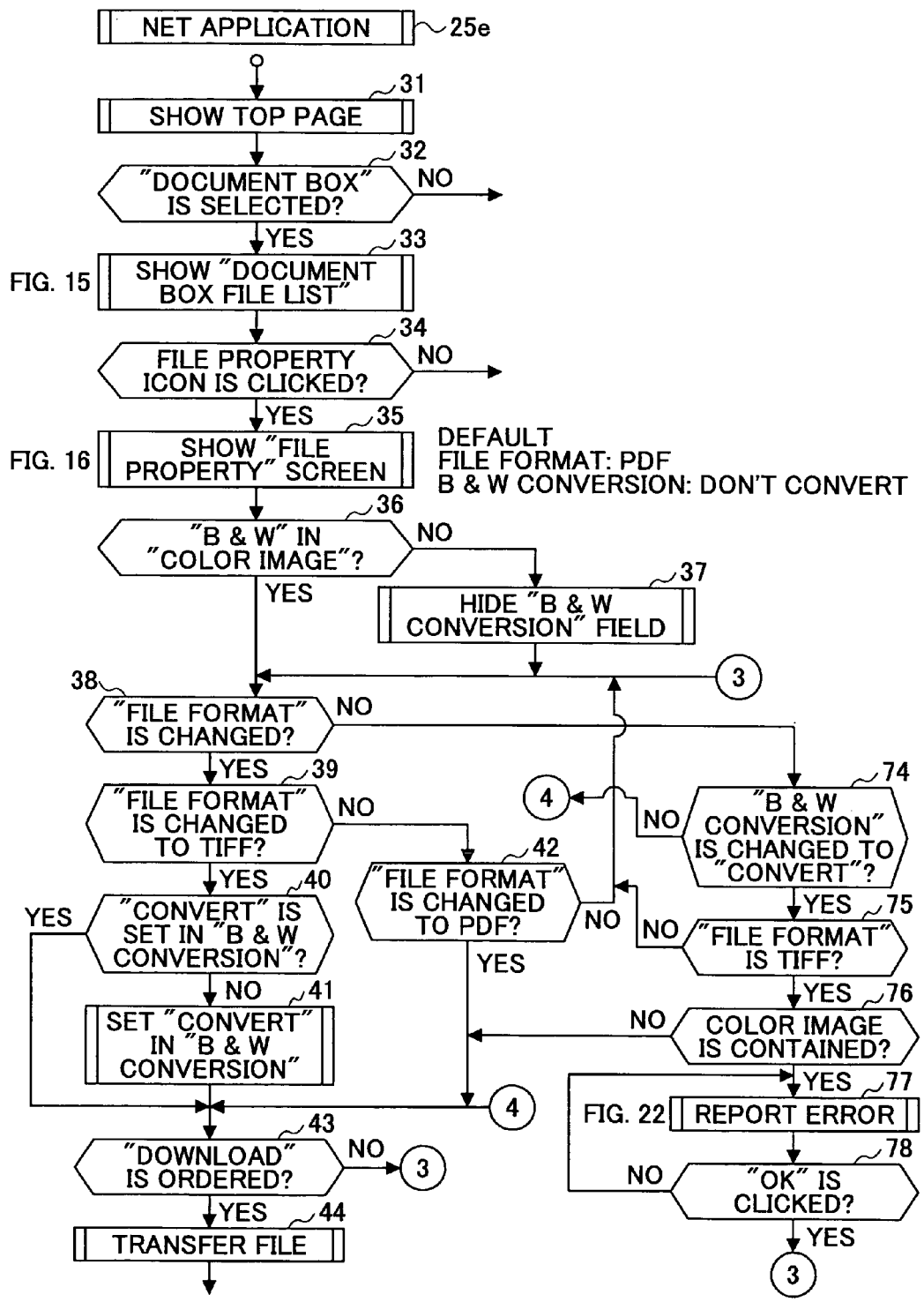
FIG. 29 is a flowchart showing a part of network delivery control of text/image information performed by a network controller of a text/image storage device as a sixth embodiment of the present invention with use of server software.

FIG. 29 illustrates operations of the "Net application" (25e) executed by the network controller 178 according to the sixth embodiment. In the case where the file format is TIFF and a color image is contained, if the selection in the "black-and-white conversion" is changed from "Convert" to "Don't convert", the network controller 178 of the sixth embodiment displays an error message as shown in FIG. 29 (74-77). The user clicks "OK" and changes the selection. The operations do not proceed to the "transfer file" step (44) until the error is corrected.

The present application is based on Japanese Priority Application No. 2004-265391 filed on Sep. 13, 2004, with the Japanese Patent Office, the entire contents of which are hereby incorporated by reference.

What is claimed is:

1. A file storage device, comprising:
a first memory unit configured to store a table including permissible combinations of data formats and corresponding file formats;
a second memory unit configured to store an information file in a first data format and a corresponding first file format;
a receiving unit configured to receive information from a user terminal indicating a combination of a second data format and a corresponding second file format, wherein the information from the user terminal further indicates that the information file in the first data format and the first file format is to be converted to the second data format and second file format;
a determination unit configured to determine whether the combination of the second data format and the second file format indicated by the information received from the user terminal is included in the table;
a processing unit configured to, in response to a determination by the determination unit that the combination of the second data format and the second file format indicated by the information received from the user terminal is not included in the table, automatically change the combination of the second data format and the second file format to a permissible combination of a data format and a file format included in the table, thereby causing the user terminal to display the permissible combination of the data format and the file format;
a data format conversion unit configured to, in response to a request from the user terminal, convert the information file in the first data format and the first file format into one combination of the second data format and the second file format if determined by the determination unit to be included in the table, and the permissible combination of file format and data format generated by the processing unit; and
a delivery unit configured to deliver the information file converted by the data format conversion unit.

2. A system, comprising:
the file storage device of claim 1;
an image device configured to take an image; and
an image data processing device configured to store data of the image taken by the imaging device as the information file in the file storage device.

3. The system as claimed in claim 2, wherein the imaging device includes a document scanner configured to read an image of a document and to generate the image data.

4. A system comprising:
the file storage device of claim 1;
a printer configured to print an image represented by image data on a sheet; and
an image data processing device configured to convert image data contained in an image information file stored in the file storage device into image data printable by the printer, and to output the converted image data to the printer.

5. The system as claimed in claim 4, wherein the imaging device includes a document scanner configured to read an image of a document and to generate the image data.

6. The system as claimed in claim 4, wherein the image data processing device is configured to convert image information specified by a printing instruction received from the user terminal into the image data printable by the printer, and to output the image data to the printer.

7. A system, comprising:
the file storage device of claim 1;
an imaging device configured to take an image;
a printer configured to print an image represented by image data on a sheet; and
an image data processing device configured to store data of the image taken by the imaging device as the information file in the file storage device, and to convert the image data contained in the image file stored in the file storage device into image data printable by the printer, and output the converted image data to the printer.

8. The system as claimed in claim 7, wherein the imaging device includes a document scanner configured to read an image of a document and to generate the image data.

9. The system as claimed in claim 7, wherein the image data processing device is configured to convert image information specified by a printing instruction received from the user terminal into the image data printable by the printer, and to output the image data to the printer.

10. The file storage device of claim 1, wherein the receiving unit is further configured to generate a graphical user interface for the user terminal, said graphical user interface including a user selectable field to perform a black-and-white conversion if the information file is determined not to be a black-and-white document, and said graphical user interface not including a user selectable field to perform a black-and-white conversion if the information file is determined to be a black-and-white document.

11. The file storage device of claim 1, wherein the receiving unit is further configured to generate a graphical user interface for the user terminal, said graphical user interface including property information for the information file, the property information including a color of the information file.

12. The file storage device of claim 1, wherein the first data format is a color image or a grayscale image, and the second data format is a black-and-white image.

13. The file storage device of claim 1, wherein the first data format is a color image or a grayscale image, and the second data format is a binary image.

14. The file storage device of claim 1, wherein the data format conversion unit is configured to convert only selected sub-portions of the information file.

15. The file storage device of claim 1, wherein the processing unit is further configured to cause the user terminal to issue a notification that an impermissible combination of data format and file format has been selected.

16. A file storage device, comprising:
means for storing a table including permissible combinations of data formats and corresponding file formats;
means for storing an information file in a first data format and a corresponding first file format;
means for receiving information from a user terminal indicating a combination of a second data format and a corresponding second file format, wherein the information from the user terminal further indicates that the information file in the first data format and the first file format is to be converted to the second data format and second file format;
means for determining whether the combination of the second data format and the second file format indicated by the information received from the user terminal is included in the table;
means for automatically changing, in response to a determination by the means for determining that the combination of the second data format and the second file format indicated by the information received from the user terminal is not included in the table, the combination of the second data format and the second file format to a permissible combination of a data format and a file format included in the table, thereby causing the user terminal to display the permissible combination of the data format and the file format;
means for converting, in response to a request from the user terminal, the information file in the first data format and the first file format into one combination of the second data format and the second file format if determined by the means for determining to be included in the table, and the permissible combination of file format and data format generated by the means for automatically changing; and
means for delivering, in response to a request from the user terminal through the means for communicating, the information file converted by the means for converting.

17. The file storage device of claim 16, wherein the means for processing further causes the user terminal to issue a notification that an impermissible combination of data format and file format has been selected.

18. A non-transitory computer readable storage medium encoded with instructions, which when executed by a computer causes the computer to implement a method comprising:
storing a table including permissible combinations of data formats and corresponding file formats in a memory device;
storing an information file in the memory device in a first data format and a corresponding first file format;
receiving information from a user terminal indicating a combination of a second data format and a corresponding second file format, wherein the information from the user terminal further indicates that the information file in the first data format and the first file format is to be converted to the second data format and second file format;
determining whether the combination of the second data format and the second file format indicated by the information received from the user terminal is included in the table;
automatically changing, with a processing unit, in response to a determination by the determining that the combination of the second data format and the second file format indicated by the information received from the user terminal is not included in the table, the combination of the second data format and the second file format to a permissible combination of a data format and a file format included in the table, thereby causing the user terminal to display the permissible combination of the data format and the file format;
converting, in response to a request from the user terminal, the information file in the first data format and the first file format into one combination of the second data format and the second file format if determined by the determining to be included in the table, and the permissible combination of file format and data format generated by the automatically changing; and
delivering, with a delivery unit, in response to a request from the user terminal, the information file converted by the converting.

19. The non-transitory computer readable storage medium of claim 18, wherein the method further comprises causing the user terminal to issue a notification that an impermissible combination of data format and file format has been selected.

* * * * *